US009608450B2

(12) United States Patent
Cousineau

(10) Patent No.: US 9,608,450 B2
(45) Date of Patent: Mar. 28, 2017

(54) MODULAR STATIC CONVERTERS WITH PARALLEL OR SERIES ARCHITECTURE AND DECENTRALIZED MODULAR CONTROL (DMC)

(71) Applicants: Institut National Polytechnique de Toulouse, Toulouse (FR); CENTRE NATIONAL DE LA RECHERCHE SCIENTIFIQUE (C.N.R.S), Paris (FR)

(72) Inventor: Marc Cousineau, Lavaur (FR)

(73) Assignee: Centre National De La Recherche Scientifique (FR)

(*) Notice: Subject to any disclaimer, the term of this patent is extended or adjusted under 35 U.S.C. 154(b) by 284 days.

(21) Appl. No.: 14/412,542

(22) PCT Filed: Jul. 1, 2013

(86) PCT No.: PCT/EP2013/063784
§ 371 (c)(1),
(2) Date: Jan. 2, 2015

(87) PCT Pub. No.: WO2014/005973
PCT Pub. Date: Jan. 9, 2014

(65) Prior Publication Data
US 2015/0326021 A1 Nov. 12, 2015

(30) Foreign Application Priority Data
Jul. 4, 2012 (FR) ...................................... 12 56408

(51) Int. Cl.
*H02J 4/00* (2006.01)
*H02M 3/158* (2006.01)
(Continued)

(52) U.S. Cl.
CPC ............. *H02J 4/00* (2013.01); *H02M 3/1584* (2013.01); *H02M 7/483* (2013.01); *H02M 2001/0025* (2013.01); *Y10T 307/549* (2015.04)

(58) Field of Classification Search
CPC ........ H02J 4/00; H02M 3/1584; H02M 7/483; H02M 2001/0025; Y10T 307/549
(Continued)

(56) References Cited

U.S. PATENT DOCUMENTS 4,814,963 A * 3/1989 Petersen ................. H02J 1/102
                                                                307/82
5,162,663 A * 11/1992 Combs ..................... H02J 9/061
                                                                307/29
(Continued)

FOREIGN PATENT DOCUMENTS

EP          0823772 A1    2/1998
EP          2458726 A1    5/2012

OTHER PUBLICATIONS

M. Cousineau et al, "Triangular Carrier Self-Alignment Using Modular Approach for Interleaved Converter Control", Proceedings of the 2011-14th European Conference on Power Electronics and Applications, Aug. 30, 2011, pp. 1-10, XP055059797.
(Continued)

*Primary Examiner* — Rexford Barnie
*Assistant Examiner* — Terrence Willoughby
(74) *Attorney, Agent, or Firm* — Berenato & White, LLC

(57) ABSTRACT

A static converter with parallel architecture or series architecture comprises a plurality of switching cells, arranged in parallel or in series, and controlled in a decentralized manner by associated control modules, strung together according to a loop by a series of communication links.
Each control module comprises a single and different local unit for generating the triangular carrier of the module which
(Continued)

controls the positioning of its interleaving phase as a function only of the signals of the triangular carriers of the two adjacent modules.

Each control module comprises a local unit for balancing the currents of branches and/or a unit for internal regulation of the output voltage of AVP type, or a local unit for balancing the cell voltages and/or a unit for internal regulation of the input current or output current of the ACP type.

19 Claims, 21 Drawing Sheets

(51) Int. Cl.
*H02M 7/483* (2007.01)
*H02M 1/00* (2006.01)
(58) Field of Classification Search
USPC .......................................... 307/45, 52, 58, 82
See application file for complete search history.

(56) References Cited

U.S. PATENT DOCUMENTS

| | | | |
|---|---|---|---|
| 6,369,462 B1* | 4/2002 | Siri | G05F 1/67 307/51 |
| 6,433,522 B1* | 8/2002 | Siri | G05F 1/67 320/101 |
| 2009/0273956 A1* | 11/2009 | Castelli Dezza | H02M 7/25 363/67 |
| 2010/0213767 A1* | 8/2010 | Siri | H02J 1/102 307/82 |
| 2010/0264744 A1* | 10/2010 | Schmitt | H02M 7/493 307/82 |
| 2012/0007431 A1* | 1/2012 | Jang | H02J 4/00 307/82 |

OTHER PUBLICATIONS

M. Le Bolloch et al, "New Masterless Modular Current-Sharing Technique for DC/DC Parallel Converters", 14th International Power Electronics and Motion Control Conference, 2010, IEEE, pp. T3-73-T3-80, XP031778624.

G. Schuellein, "Current Sharing of Redundant Synchronous Buck Regulators Powering High Performance Microprocessors using the V2 Control Method", Applied Power Electronics Conference and Exposition, 1998. APEC '98. Conference Proceedings 1998., Thirteenth Annual Anaheim, CA, USA Feb. 15-19, 1998, New York, NY, USA, IEEE, pp. 853-859, XP010263692.

* cited by examiner

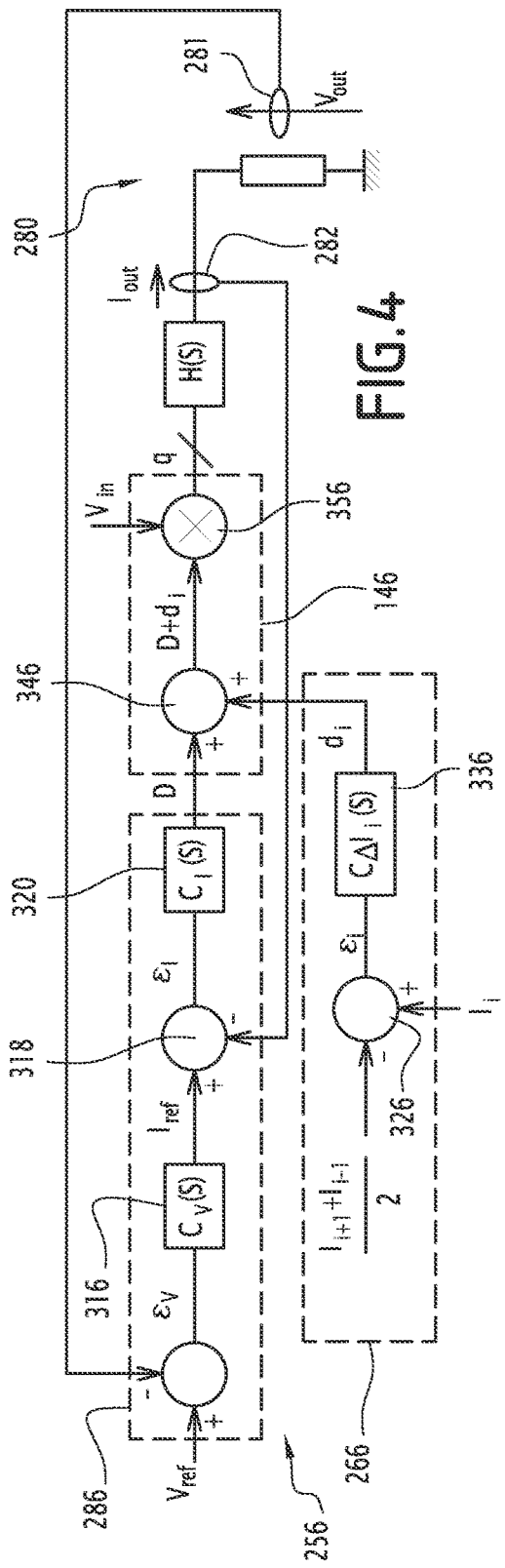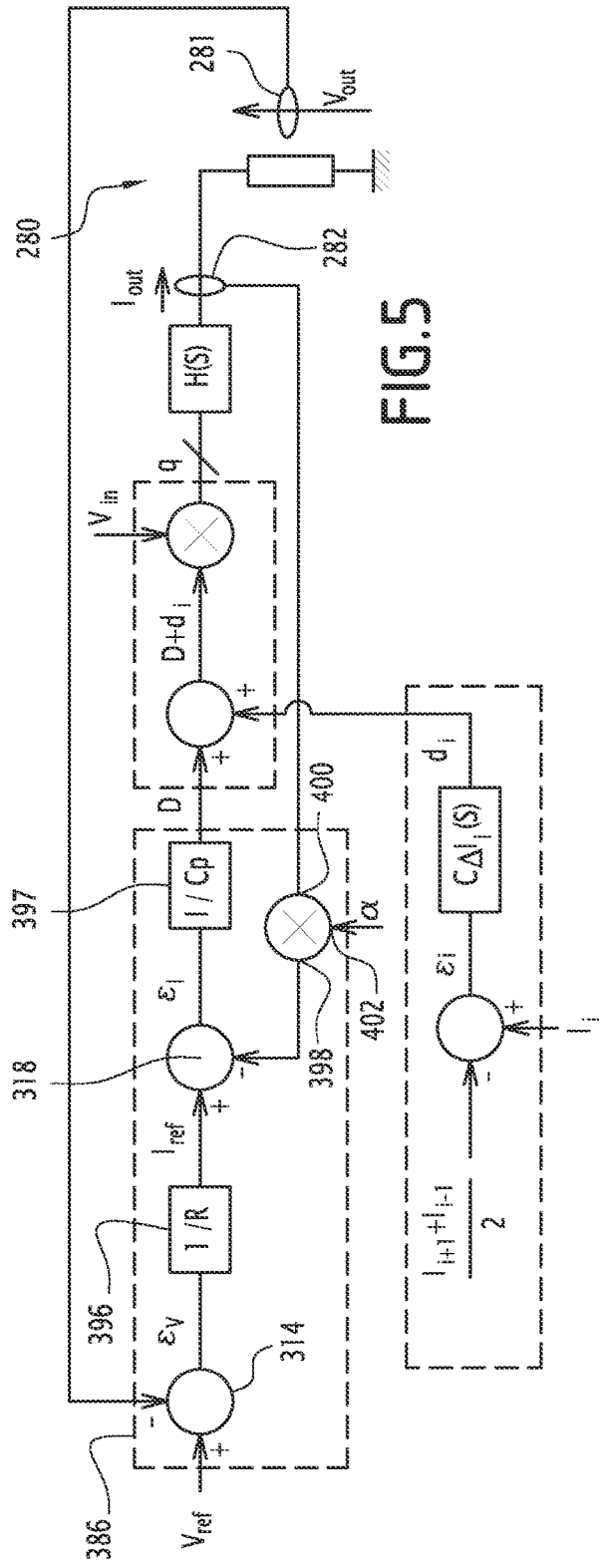

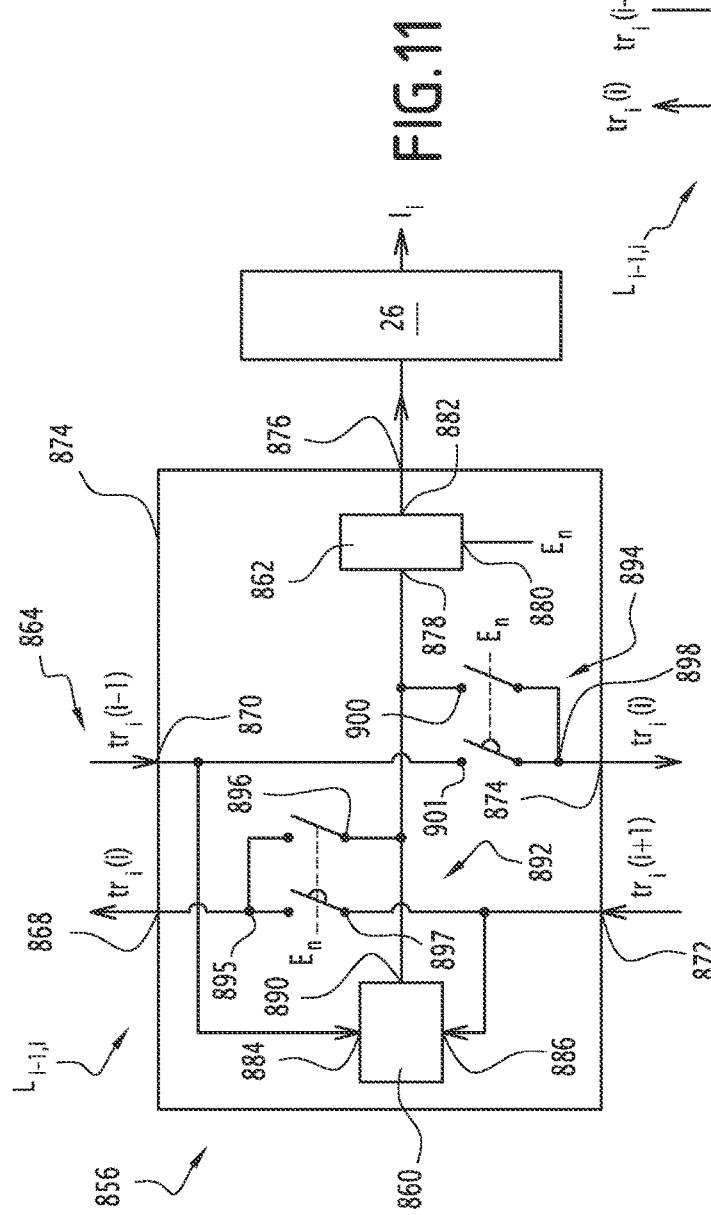
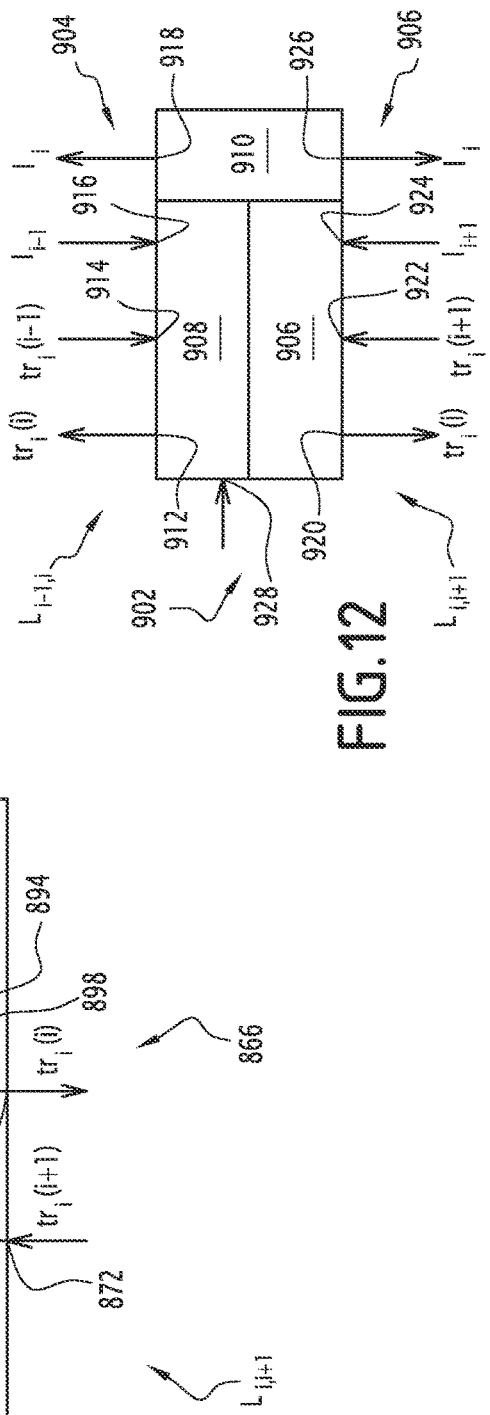
FIG.11
FIG.12

MODULAR STATIC CONVERTERS WITH PARALLEL OR SERIES ARCHITECTURE AND DECENTRALIZED MODULAR CONTROL (DMC)

CROSS-REFERENCE TO RELATED APPLICATIONS AND CLAIM TO PRIORITY

This application is a national stage application of International Application No. PCT/EP2013/063784 filed Jul. 1, 2013, which claims priority to French Patent Application No. 12 56408 filed Jul. 4, 2012, of which the disclosures are incorporated herein by reference and to which priority is claimed.

FIELD OF THE INVENTION

Modular static converters modular static converters with parallel or series architecture and decentralized modular control (DMC).

Parallel series architectures of static converters are known to have several switching cells placed either in parallel or in series.

DESCRIPTION OF RELATED ART

In most cases, a centralized control member is necessary for those cells to determine and transmit the control orders suitable for regulating and balancing the entire converter structure.

For applications with a high output current, low output voltage and high output dynamic, parallel structures offer significant advantages. The most obvious application is powering microcontrollers, which for example requires average currents of 100 A at a voltage close to 1 V with dynamics of approximately 100 A/ns. These close power supplies are traditionally called Voltage Regulator Modules (VRM).

By using parallel structures, a high apparent frequency is obtained on the wave of the current at the input and output of the converter, which makes it possible to reduce the bulk of the filters. Each switching branch of the converter only allows a fraction of the output current to flow, which makes it possible to reduce the constraints associated with the inductor of the branch and to use fast switches with a low current caliber. Furthermore, inductive storage is considerably reduced because the inductors are arranged in parallel, which makes it possible to obtain very short response times in order to react to quasi-instantaneous load variations correctly.

The centralized control member or supervisor of the parallel architecture converter is configured to perform three functions. A first function is to provide interleaving of the Pulse Width Modulation (PWM) commands. A second function is to calculate the cyclic ratio making it possible to regulate the output voltage, here the voltage of the microcontroller. A third function is to determine the corrections to be made to each PWM signal in order to equalize the currents of the converter branches, each branch providing the supervisor with information on the value of the current passing through it.

For conversion applications requiring a high-voltage transform factor or that must ensure a low distortion level, the series structures offer major advantages. A first application pertains to the case of increasing a direct voltage with a low value to a direct voltage with a very high value. That case involves producing a booster having an amplification factor greater than 50, such a factor not being able to be achieved with a switching cell architecture for which the cyclic ratio is too close to one. A second application pertains to DC/AC and AC/DC conversion cases requiring a very low distortion level (THD) below 3%. In that case, a series multi-cell approach makes it possible to obtain voltage waveforms approaching sinusoidal signals as much as possible.

By using series structures, a high apparent frequency is obtained on the wave of the input and output voltage of the converter, which makes it possible to reduce the bulk of the filters. Each switching cell of the converter is only subjected to a fraction of the total input voltage, which makes it possible to use switches with a low-voltage caliber.

Like the supervisor of the parallel architecture converter, the supervisor of the series architecture converter is configured to perform three main functions. A first function is to provide interleaving of the Pulse Width Modulation (PWM) commands. A second function is to calculate the cyclic ratio making it possible to regulate the output current. A third function is to determine the corrections to be made to each PWM signal in order to equalize the voltages of the elementary cells of the converter, each cell providing the supervisor with information on the value of the voltage to which it is subjected.

It should be noted that the parallel and series structures of static converters are dual structures with respect to each other in terms of a symmetry existing between the current properties and the voltage properties.

Parallel and series architecture converters share the main drawback of requiring the implementation of a large number of interconnections making it possible to provide the link between the centralized supervisor and the various switching cells. Thus, in the case where the supervisor is made by an FPGA, the number of pins of the component limits the number of switching cells that can be controlled.

Thus, the decentralization of the calculation and control tasks performed by the centralized supervisor is sought by locally entrusting those tasks to proximity circuits called control modules, which are dedicated to controlling the switching cells.

A first step was taken by making a generic control module able to generate its own triangular carrier and impose its phase, i.e., it is time position, based on the other interleaved carriers of the converter.

The production of such a module is described in the article by Marc Cousineau et al. entitled "Triangular Carrier Self-Alignment Using Modular Approach for Interleaved Converter Control", EPE 2011: 14th European Conference on Power Electronics and Applications, Birmingham, UK, 1 Sep. 2011.

The technical problem is to increase the degree of local integration of the control functions of the converter within the control modules.

In the case of parallel architectures, this involves making the module capable of providing the local correction necessary to equalize the value of its branch current with the mean value of all of the branch currents of the converter, and of determining the value of the local cyclic ratio of its branch so that all of the modules eventually impose an output voltage value equal to an input setpoint value designated by Vref or a current value equal to an input setpoint value designated by Iref.

BRIEF SUMMARY OF THE INVENTION

To that end, the invention relates to a static converter with parallel architecture, designed to be powered by a voltage source Vin and to provide an output current Iout, comprising a first power supply input terminal, a second power supply input terminal, an output terminal, a total number q of electronic switching cells arranged in parallel, a total number q of output branches connected in common along first ends to the output terminal, a same total number q of control modules, a chain of q communication links connecting the control modules of a closed loop, each electronic switching cell being associated with a single and different control module and with a single and different output branch, the associated module, switching cell and output branch being identified by a same single and different integer rank, comprised between 1 and q, for positioning i within the communication chain, any two control modules, adjacent within the communication chain and with respective rank i, i+1, being connected by a single and different communication link $L_{i,i+1}$, the switching cells each comprising a single and different pair of two electronic switches connected in series, a first cell power supply terminal, a second cell power terminal supply and a single and different intermediate output terminal, shared by the two electronic switches connected in series and connected to a second end of the associated output branch, the first cell power supply terminals and the second cell power supply terminals being connected to the first power supply input terminal and the second power supply input terminal, respectively, each control module respectively comprising a single and different local unit for generating a unique triangular voltage carrier, the local unit for generating the triangular carrier of any control module with rank i being configured to control the positioning of its interleaving phase within all of the interleaved triangular carriers based solely on the signals of the triangular carriers of the two modules with respective rank i−1, i+1 adjacent to the any module with rank i, provided by the two modules adjacent to the any module through two corresponding communication links, i being comprised between 1 and q, with i−1 equal to q when i is equal to 1, and i+1 equal to 1 when i is equal to q, characterized in that each control module respectively comprises a single and different local unit for balancing the currents, and/or a single and different unit for internal regulation of the output voltage of the AVP type, the local unit for balancing the currents of any module with rank i being configured to determine a cyclic ratio correction di based solely on the difference between the mean of the values of the two currents $I_{i-1}$, $I_{i+1}$ passing through the two output branches of the switching cells whose modules are adjacent to the any module with rank i and the value of the current Ii passing through the branch connected to the switching cell associated with the any module of rank i, the internal unit regulating the output voltage of the AVP type of any module with rank i being configured by implementing a unique internal voltage and/or current loop to determine a unique cyclic ratio Di, the determination of Di depending on a product of the value of the current Ii passing through the branch connected to the switching cell associated with the any module with rank i and a slope factor αi depending on the rank i of the module.

According to one particular embodiment, a static converter with parallel architecture comprises one or more of the following features:

each control module comprises a local unit for balancing the currents and an internal unit for regulating the output voltage of the AVP type, or comprises a local unit for balancing the currents while having no internal unit for regulating the output voltage of the AVP type, and for each branch associated with any module i, an individual measurement of the current Ii passing through the branch is provided when the any module comprises a local unit for balancing the currents and an internal unit for regulating the output voltage of the AVP type, and for each branch associated with any module i, either an individual measurement of the current Ii passing through the branch is provided, or two differential measurements between the current passing through the branch associated with the any module and the currents passing through the two branches respectively associated with the modules adjacent to the any module are provided, when the any module comprises a local unit for balancing currents and does not have an internal unit for regulating the output voltage of the AVP type;

each control module comprises a local unit for balancing currents and does not have an internal unit for regulating the output voltage of the AVP type, and a main voltage and/or current regulating loop, outside the modules, is configured by an outside regulating module to determine a common mode cyclic ratio D with the branches from a measurement of the output voltage Vout and/or a measurement of the output current Iout, and from a reference voltage Vref and/or a reference current Iref, and each module with rank i comprises a receiving terminal connected to the external regulating unit to receive the common mode cyclic ratio D, and a single and different adder to calculate a corrected cyclic ratio D'i as the sum of the cyclic ratio D of the common mode and the cyclic ratio correction di determined by the local unit for balancing the currents of the module i;

a main voltage and current regulating loop, outside the modules and of the AVP type, is configured by an external regulating unit to determine a common mode cyclic ratio D with branches from the measurement of the output voltage Vout, the measurement of the output current Iout, the reference voltage Vref and a main slope factor α for dummy current source, and each module with rank i comprises a receiving terminal connected to the external regulating unit to receive the common mode AVP cyclic ratio D, and a single and different adder circuit to calculate a corrected cyclic ratio D'i as the sum of the common mode AVP cyclic ratio D and the cyclic ratio correction di determined by the local unit for balancing the currents of the module i;

each control module comprises a local unit for balancing currents and an internal unit for regulating the output voltage of the AVP type, and each internal unit for regulating the output voltage of the AVP type comprises an internal loop for regulating the voltage of the AVP type, configured to determine a unique common mode cyclic ratio Di from a measurement of the output voltage Vout, a measurement of the output current Ii passing through the associated branch, a reference voltage Vref, and a corrected slope factor αi, the corrected slope factor αi is proportional to the product of a mean main slope factor α shared by all of the modules and the corrective factor $V_{ctrl}(i)$ determined by the local unit for balancing the currents of the module i according to a proportionality ratio independent of the rank i of the module, the unique common mode cyclic ratio Di depends on the difference between a reference current Iref and the product of the slope correction factor αi and the value of the measured branch current Ii, the reference current Irf being proportional to the difference between the reference voltage Vref and the value of the output voltage Vout measured according to a constant 1/R that is substantially identical over all of the modules;

each control module comprises an internal unit for regulating the output voltage of the AVP type and does not have a local unit for balancing currents, and each internal unit for regulating the output voltage of the AVP type comprises an internal voltage regulating loop of the AVP type, configured to determine a unique common mode cyclic ratio Di from an output voltage measurement Vout, an output current measurement Ii passing through the associated branch, a reference voltage Vref, and a unique current source slope factor $\alpha i$, the unique slope factor $\alpha i$ is adjusted to be substantially equal to a main slope factor value $\alpha$ shared by all of the modules, the unique common mode cyclic ratio Di depends on the difference between a reference current Iref and the product of the unique slope factor $\alpha i$ and the value of the measured branch current Ii, the reference current Irf being proportional to the difference between the reference voltage Vref and the value of the output voltage Vout measured according to a constant 1/R that is substantially identical over all of the modules;

each module with any rank i, the modules adjacent to that module with rank i−1, i+1, and the corresponding communication links $L_{i-1,i}$, $L_{i,i+1}$ are configured to exchange relevant information related to the module of any rank i taken from among the current $I_i$ of the branch with rank i, the currents $I_{i+1}$, $I_{i-1}$ of the adjacent branches with rank i−1, i+1, the differential currents $I_i - I_{i-1}$ and $I_{i+1} - I_i$, the triangular carrier signals of the module of any rank i and the modules adjacent to that module with rank i−1, i+1;

each branch comprises one or more smoothing inductors, the smoothing inductors of two branches of any two adjacent modules being able to be coupled;

each module with rank i comprises a first connection port and a second connection port configured to be connected externally to a first communication link and a second communication link using a same interface, and internally to the various local units, and each module with rank i comprises a disconnection/connection unit for the connection ports of/to the local units and in parallel for connection/disconnection of the ports relative to each other, the switching between a first state in which the ports are connected to the local units and the ports are disconnected, and a second state in which the ports are disconnected from the local units and the ports are connected, being implemented by a control signal outside the module or an internal signal developed within the module.

The invention also relates to a static converter with series architecture and decentralized control, designed to be powered by a voltage supply generator Vin and a current Iin and to provide an output voltage Vout and an output current Iout, comprising a first power supply input terminal, a second power supply input terminal, an output terminal, a total number q of electronic switching cells arranged in series, a same total number q of control modules, a chain of q communication links connecting the control modules of a closed loop, each electronic switching cell being associated with a single and different control module, the electronic switching cell and the associated control module being identified by a same single and different integer positioning rank i, comprised between 1 and q and larger when the switching cell is connected as close as possible to the power supply input terminals, any two control modules, adjacent within the communication chain and with rank i, i+1, being connected by a single and different communication link $L_{i,i+1}$, the switching cells each comprising a single and different pair of electronic switches connected in parallel through a single and different floating capacitance positioned at the input of the switching cell toward the power supply input terminals when the positioning rank i is different from q, a first input pair of input terminals connected to the input of the two switches and to the floating capacitance, a second pair of output terminals connected to the output of the two switches, each control module respectively comprising a single and different local unit for generating a unique triangular voltage carrier, the local unit for generating the triangular carrier of any control module with rank i being configured to control the positioning of its interleaving phase within all of the interleaved triangular carriers based solely on the signals of the triangular carriers of the two modules with respective rank i−1, i+1 adjacent to the any module with rank i, provided by the two modules adjacent to the any module with rank i through two corresponding communication links, i being comprised between 1 and q, with i−1 equal to q when i is equal to 1, and i+1 equal to 1 when i is equal to q, characterized in that each control module respectively comprises a single and different local unit for balancing voltages, and/or a single and different unit for internal regulation of the input current of the ACP type, the local unit for balancing the cell voltages of any module with rank i being configured to determine a cyclic ratio correction di based solely on the difference between the mean of the values of the two cell voltages $V_{i-1}$, $V_{i+1}$ of the switching cells whose modules with respective rank i−1, i+1 are adjacent to the any module with rank i and the value of the cell voltage Vi of the switching cell, the cell voltage Vi of any switching cell with rank i being equal to the difference between the differential input voltage Vai and the differential output voltage Vbi of the switching cell with rank i, and the internal unit regulating the input or output current of the ACP type of any module with rank i being configured by implementing a unique internal voltage and/or current loop to determine a unique cyclic ratio Di, the determination of Di depending on a product of the value of the voltage Vi passing through the branch connected to the switching cell associated with the any module with rank i and a slope factor $\alpha i$ depending on the rank i of the module.

According to particular embodiments, a static converter with series architecture comprises one or more of the following features:

each control module comprises a local unit for balancing the cell voltages and an internal unit for regulating the input or output current of the ACP type, or comprises a local unit for balancing the cell voltages while having no internal unit for regulating the input or output current of the ACP type, and for each any module i, a measurement of the voltage Vi of the corresponding switching cell is provided through a first differential measurement of the input voltage Vai and a second differential measurement of the output voltage Vbi;

each control module comprises a local unit for balancing the cell voltages while having no internal unit for regulating the input or output current of the ACP type, and a main voltage and/or current regulating loop, outside the modules, is configured by an outside regulating unit to determine a common mode cyclic ratio D from a measurement of the output voltage Vout and/or a measurement of the input current Iin or output current Iout, and from a reference voltage Vref and/or a reference current Iref, and each module with rank i comprises a receiving terminal connected to the external regulating unit to receive the common mode cyclic ratio D, and a single and different adder to calculate a corrected cyclic ratio D'i as the sum of the cyclic ratio D of the common mode and the cyclic ratio correction di determined by the local unit for balancing the cell voltages of the module i;

a main voltage and current regulating loop, outside the modules and of the ACP type, is configured by an external regulating module to determine a common mode cyclic ratio D with switching cells from the measurement of the output voltage Vout, the measurement of the input current Iin or the output current Iout, the reference current Iref and a main slope factor $\alpha$ for dummy current source, and each module with rank i comprises a receiving terminal connected to the external regulating unit to receive the ACP common mode cyclic ratio D, and a single and different adder to calculate a corrected cyclic ratio D'i as the sum of the cyclic ratio D of the ACP common mode and the cyclic ratio correction di determined by the local unit for balancing the cell voltages of the module i;

each control module comprises a local unit for balancing the cell voltages and an internal unit for regulating the input current of the ACP type, and each internal unit for regulating the input current of the ACP type comprises an internal loop for regulating the input current of the ACP type, configured to determine a unique cyclic ratio Di from a measurement of the input current Iin, a measurement of the cell voltage Vi of the cell with rank i, a reference current Iref, and a corrected inverse slope factor $\alpha i$, the corrected inverse slope factor $\alpha i$ is proportional to the product of a mean main inverse slope factor $\alpha$ of the voltage source shared by all of the modules and the corrective factor $V_{ctrl}(i)$ determined by the local unit for balancing the cell voltages of the module i according to a proportionality ratio independent of the rank i of the module, the cyclic ratio Di unique to the cell with rank i depends on the difference between a reference voltage Vref and the product of the inverse of the inverse slope factor $\alpha i$ and the value of the measured cell voltage Vi for the cell with rank i, the reference voltage Vref being proportional to the difference between the reference current Iref and the value of the input current Iin measured according to a constant Z/R that is substantially identical over all of the control modules;

each control module comprises a local unit for balancing the cell voltages and an internal unit for regulating the output current of the ACP type, and each internal unit for regulating the output current of the ACP type comprises an internal loop for regulating the current of the ACP type, configured to determine a unique cyclic ratio Di from a measurement of the output current Iout, a measurement of the cell voltage Vi of the cell with rank i, a reference current Iref, and a corrected inverse slope factor $\alpha i$, the corrected inverse slope factor $\alpha i$ is proportional to the product of a mean main inverse slope factor $\alpha$ of the voltage source shared by all of the modules and the correction factor $V_{ctrl}(i)$ determined by the local unit for balancing the cell voltages of the module i according to a proportionality ratio independent of the rank i of the module, the cyclic ratio Di unique to the cell with rank i depends on the difference between a reference voltage Vref and the product of the inverse of the corrected inverse slope factor $\alpha i$ and the value of the measured cell voltage Vi for the cell with rank i, the reference voltage Vref being proportional to the difference between the reference current Iref and the value of the output current Iout measured according to a constant Z/R that is substantially identical over all of the control modules;

each control module comprises a local unit for internal regulation of the input current of the ACP type while not having a local unit for balancing the cell voltages, and each local unit for regulating the input current of the ACP type comprises an internal loop for regulating the current of the ACP type, configured to determine a unique cyclic ratio Di from a measurement of the input current Iin, a measurement of the cell voltage Vi of the cell with rank i, a reference current Iref, and a corrected voltage source inverse slope factor $\alpha i$, the corrected inverse slope factor $\alpha i$ is adjusted to be substantially equal to an inverse main slope factor value $\alpha$ shared by all of the modules, the unique cyclic ratio Di depends on the difference between a reference voltage Vref and the product of the inverse of the unique inverse slope factor $\alpha i$ and the value of the measured cell voltage Vi for the cell with rank i, the voltage Vref being proportional to the difference between the reference current iref and the value of the input current Iin measured according to a constant Z/R that is substantially identical over all of the control modules;

each control module comprises a local unit for internal regulation of the output current of the ACP type while not having a local unit for balancing the cell voltages, and each local unit for internal regulation of the output current of the ACP type comprises an internal loop for regulating the current of the ACP type, configured to determine a unique cyclic ratio Di from a measurement of the output current Iout, a measurement of the cell voltage Vi of the cell with rank i, a reference current Iref, and a corrected voltage source inverse slope factor $\alpha i$, the corrected inverse slope factor $\alpha i$ is adjusted to be substantially equal to a main inverse slope factor value $\alpha$ shared by all of the modules, the unique cyclic ratio Di depends on the difference between a reference voltage Vref and the product of the inverse of the unique inverse slope factor $\alpha i$ and the value of the measured cell voltage Vi for the cell with rank i, the voltage Vref being proportional to the difference between the reference current iref and the value of the output current Iout measured according to a constant Z/R that is substantially identical over all of the control modules;

each module with any rank i, the modules adjacent to that module with rank i−1, i+1, and the corresponding communication links $L_{i-1,i}$, $L_{i,i+1}$ are configured to exchange relevant information related to the module of any rank i taken from among the cell voltage $V_i$ of the cell with rank i, the cell voltages $V_{i+1}$, $V_{i-1}$ of the adjacent cells with rank i−1, i+1, the triangular carrier signals of the module of any rank i and the modules adjacent to that module with rank i−1, i+1; and each module with rank i comprises a first connection port and a second connection port configured to be connected externally to a first communication link and a second communication link using a same interface, and internally to the various local units, and each module with rank i comprises a disconnection/connection unit for the connection ports of/to the local units and in parallel for connection/disconnection of the ports relative to each other, the switching between a first state in which the ports are connected to the local units and the ports are disconnected, and a second state in which the ports are disconnected from the local units and the ports are connected, being implemented by a control signal outside the module or an internal signal developed within the module.

BRIEF DESCRIPTION OF THE SEVERAL VIEWS OF THE DRAWINGS

The invention will be better understood upon reading the following description of several embodiments provided solely as an example, and done in reference to the appended drawings, in which:

FIG. 4 shows a diagram for implementing the external regulation of the voltage and output current by the external loop and module described in FIG. 2;

FIG. 5 shows an alternative of the structural embodiment of external regulation described in FIG. 4, by an external regulation module of the AVP (Adaptive Voltage Positioning) type;

FIG. 11 is a view of one example of automatic reconfiguration means for the communication chain between modules, applied to the triangular carrier generating function in the event a module is eliminated from the chain;

FIG. 12 is an example of the communication interfaces of a control module and data exchanges between adjacent modules within the communication chain;

DETAILED DESCRIPTION OF THE PREFERRED EMBODIMENT(S)

Figure 1:
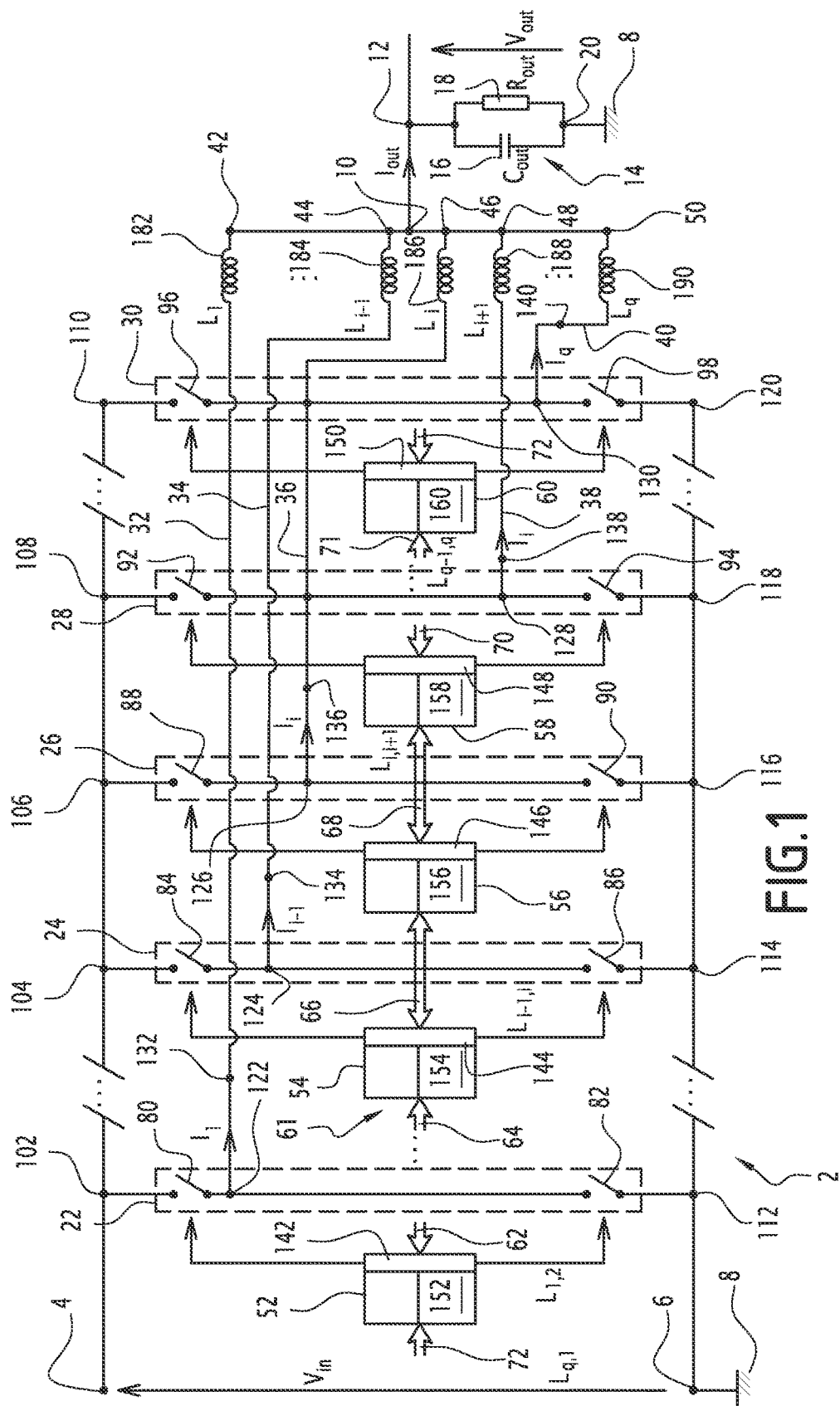
FIG. 1 is a view of a first general embodiment of a static converter with parallel architecture and DMC according to the invention.

According to FIG. 1, a static converter with parallel architecture 2 comprises a first power supply input terminal 4 and a second power supply input terminal 6, connected to a power source, not shown, under a voltage Vin, the second power supply input terminal 6 being connected to a ground 8.

The static converter 2 comprises an output terminal 10, connected to a first end 12 of an output load 14 modeled by an output capacitance 16 with value Cout and an output resistance 18 with value Rout placed in parallel, a second end 20 of the output load 14 being connected to the ground 8, and the output resistance being passed through by an output current Iout.

The static converter 2 also comprises:
- a total integer number q of switching cells 22, 24, 26, 28, 30, arranged in parallel,
- a same total number q of output branches 32, 34, 36, 38, 40 connected in common at first ends 42, 44, 46, 48, 50 to the output terminal 10,
- a same total number q of control modules 52, 54, 56, 58, 60,
- a communication chain 61 having a same number q of communication links 62, 64, 66, 68, 70, 72 connecting the control modules 52, 54, 56, 58, 60 in a daisy chain.

In general, the total number q is greater than or equal to 3.

Each electronic switching cell is respectively associated with a single and different control module and with a single and different output branch.

Any control module, any switching cell, any output branch, associated with each other, are identified by a same single and different integer positioning rank within the communication chain comprised between 1 and q.

As an example in FIG. 1, the total shared number q of switching cells, control modules and output branches is greater than or equal to 7. Only five modules are shown: a first control module 52 having a rank i equal to 1; a second module 56, which is a generic module, having a current index rank i; a third module 54 having a rank with index i−1 and being an adjacent generic module preceding the generic module 56 in the communication chain 61; a fourth module 58 having a rank with index i+1 and being an adjacent generic module following the generic module 56 in the chain; and a fifth control module 60 having a rank i equal to q and being an adjacent module preceding the first generic module 52 with rank 1.

Any two adjacent control modules in the communication chain 61, having respective ranks i and i+1 within the communication chain 61, are connected by a single and different communication link, designated Li,i+1.

It should be noted that in the minimum structure of a converter with three control modules and three switching cells, the adjacent module following the module with rank 3 is the module with rank 1, and the adjacent module rank preceding module rank 1 is module rank 3.

It should also be noted that the positioning rank i depends only on the order set by the connectivity of the control modules within the loop making up the communication chain 61 and does not depend on an order set by the relative spatial arrangement of the switching cells with respect to one another.

The switching cells 22; 24; 26; 28; 30 respectively comprise a single and different pair of electronic switches 80, 82; 84, 86; 88, 90; 92, 94; 96, 98; connected in series, a first power supply terminal 102; 104; 106; 108; 110; a second power supply terminal 112; 114; 116; 118; 120, and a single and different intermediate output terminal 122; 124; 126; 128; 130 respectively shared by the two associated electronic switches 80, 82; 84, 86; 88, 90; 92, 94; 96, 98 and respectively connected to a second end 132; 134; 136; 138; 140 of the associated output branch 32, 34, 36, 38, 40.

The first cell power supply terminals 102; 104; 106; 108; 110 and the second power supply terminals 122; 124; 126; 128; 130 are connected being connected to the first power supply input 4 terminal and the second power supply input terminal 6, respectively.

Each control module 52, 54, 56, 58, 60 respectively comprises an amplified driving unit 142, 144, 146, 148, 150 for the two switches of the corresponding switching cell 22, 24, 26, 28, 30, and a single and different local unit 152, 154, 156, 158, 160 for generating a unique triangular voltage carrier.

Each local unit for generating the triangular carrier of any control module having a current rank i is configured to control the positioning of its interleaving phase within all of the interleaved triangular carriers based only on the signals of the triangular carriers of the two modules adjacent to the any module with rank i and having respective ranks i−1, i+1, provided by the two adjacent modules i−1, i+1 to the any module with rank i through the two corresponding communication links $L_{i-1,i}$ and $L_{i,i+1}$. The rank with position i is comprised between 1 and q with i−1 equal to q when i is equal to q and i+1 equal to 1 when i is equal to q.

Thus, for example, the local unit 152 for generating the triangular carrier of the first control module 52 with rank 1 is configured to control the positioning of its interleaving phase within all of the interleaved triangular carriers based only on the signals of the triangular carriers of its two adjacent modules having respective ranks q, 2, provided by the two modules q, 2 adjacent to the first module 52 through two corresponding communication links 72, 62, designated $L_{q,1}$ and $L_{1,2}$.

Likewise, the local unit 160 for generating the triangular carrier of the fifth control module 60 with rank q is configured to control the position of its interleaving phase within all of the interleaved triangular carriers based only on the signals of the triangular carriers of its two adjacent modules having respective ranks q−1, 1, provided by the same two modules q−1, 1 adjacent to the fifth module 160 with rank q through the two corresponding communication links 71, 72, designated $L_{q-1,q}$ and $L_{q,1}$.

Each control module 52, 54, 56, 58, 60 comprises a local unit for balancing currents, not shown in FIG. 1, and/or an internal unit for regulating the output voltage of the AVP type, not shown in FIG. 1.

Each local unit for balancing the currents of any module with rank i is configured to determine a cyclic ratio correction di based only on the difference between the mean of the values of two currents, denoted $I_{i-1}$, $I_{i+1}$, passing through the two branches of the switching cells whose modules are adjacent to the any module with rank i and the value of the current Ii passing through the branch connected to the switching cell associated with the any module with rank i.

Each internal unit regulating the output voltage of the AVP type of any module i is configured by implementing a unique voltage and/or current loop to determine a unique cyclic ratio Di, the determination of Di depending on a product of the value of the current Ii passing through the branch connected to the switching cell associated with the any module and a slope factor αi depending on the rank i of the module. Adjusting this factor αi allows a correct adjustment of the slope of the characteristic $V_{out}=f(I_{out})$ procured by the AVP-type regulation.

Each output branch 32, 34, 36, 38, 40 and with rank 1, i−1, i, i+1, q comprises at least one smoothing inductor, respectively designated 182, 184, 186, 188, 190, a fraction of the output current passing through the branch, respectively denoted $I_1$, $I_{i-1}$, $I_i$, $I_{i+1}$, $I_q$ the inductors of any two adjacent branches here having no coupling with respect to one other.

Thus, the association in each module of the AVP-type output voltage regulation, balancing of the branch currents and generation of carriers with management of their interleaving makes it possible to obtain a fully decentralized control of a parallel converter comprising any number q of switching cells. There is then no longer any need for a centralized control member.

Figure 2:
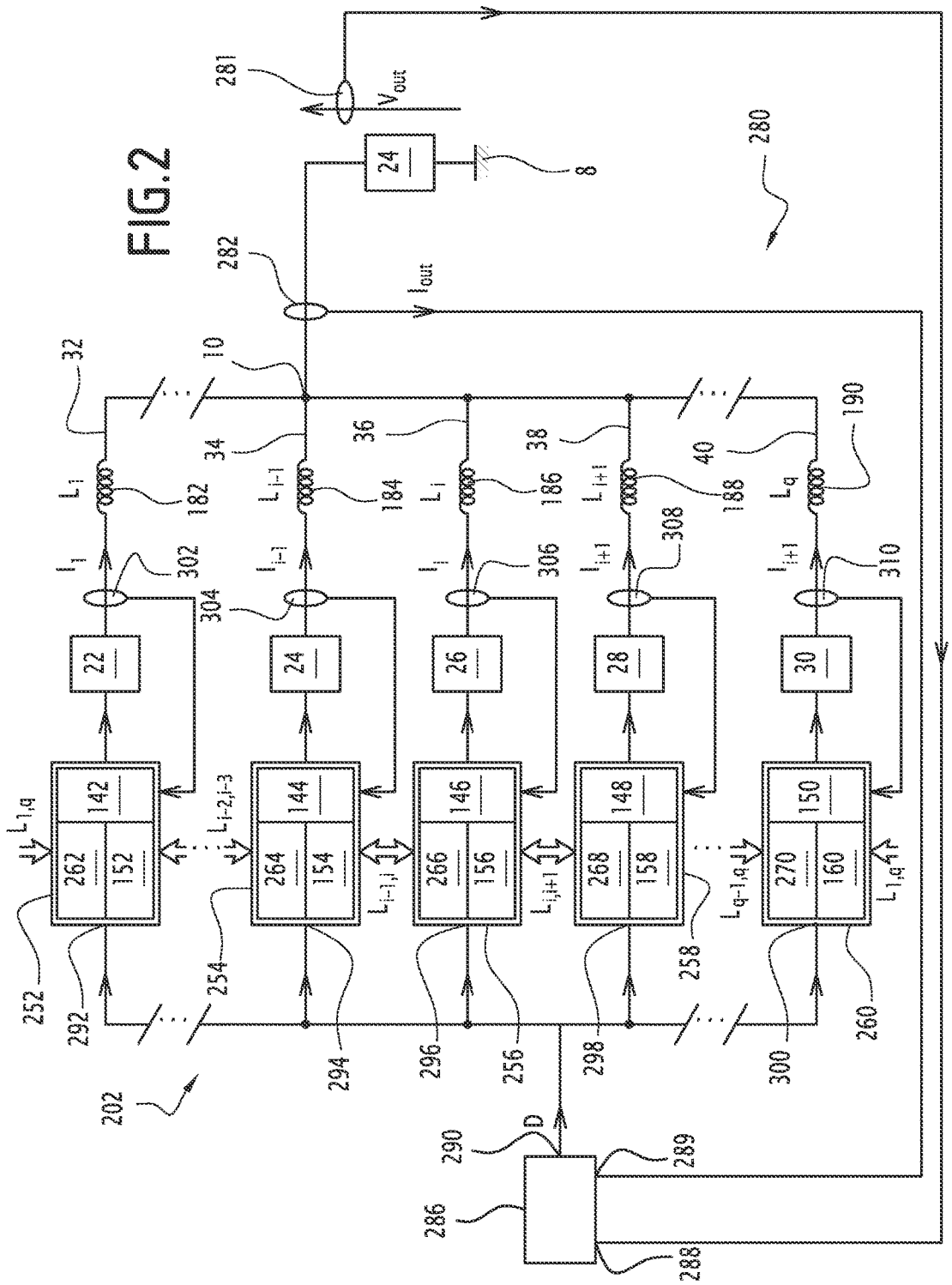
FIG. 2 is a view of a second embodiment of a static converter with parallel architecture and DMC according to the invention, derived from the first general embodiment described in FIG. 1 and in which an external regulation of the voltage and output current is implemented by an external loop and module, the interleaving of the control and balancing of the branch currents are implemented by local units for balancing the branch currents.

According to FIG. 2, a second embodiment 202 of the DMC of the static converter comprises components identical to those described in FIG. 1, which bear the same numerical references and are arranged in the same architecture.

The static converter 202 with a parallel architecture comprises control modules 252, 254, 256, 258, 260, each associated with a single and different output branch 32, 34, 36, 38, 40, and respectively having the same amplified driving units 142, 144, 146, 148, 150 and the same local units 152, 154, 156, 158, 160 for generating a unique triangular voltage carrier.

Each control module 252, 254, 256, 258, 260 respectively comprises a local unit for balancing the currents 262, 264, 266, 268, 270 while not having a local unit for internal regulation of the output voltage of the AVP type.

Each local unit for balancing the currents of any module i, i varying from 1 to q, is configured to determine a cyclic ratio correction di based only on the difference between the mean of the values of the two currents $I_{i-1}$, $I_{i+1}$ passing through the two branches of the switching cells whose modules are adjacent to the any module and the value of the current Ii passing through the branch connected to the switching cell associated with the any module.

The static converter 202 comprises a main external voltage and current loop 280 in which the output voltage Vout and the output current Iout are observables whose images are respectively taken by a voltage tap 281 and a current tap 282.

The static converter 202 comprises an external regulating module 286 having a first input terminal 288, a second input terminal 289 and an output terminal 290.

The first input terminal 288 and the second input terminal 289 are respectively connected to the voltage tap 281 and the current tap 282 to receive a measurement signal representative of the output voltage Vout and the measurement signal representative of the output current Iout.

The external module for external regulation 286 is configured to determine a common mode cyclic ratio D for the output branches from the measurement of the output voltage Vout and the measurement of the output current Iout, and from a reference voltage Vref.

The output terminal 290 of the external regulating module 286 is connected in a shared manner to each local control module 252, 254, 256, 258, 260 through an associated single and different input terminal 292, 294, 296, 298, 300 to provide the same common mode cyclic ratio D to the switching cells 22, 24, 26, 28, 30.

Each branch 32, 34, 36, 38, 40, associated with the module 252, 254, 256, 258, 260 with perspective rank 1, i−1, i, i+1, q here comprises a single and different individual tap 302, 304, 306, 308, 310 for measuring the current $I_1$, $I_{i-1}$, $I_i$, $I_{i+1}$, $I_q$ respectively passing through the output branch 32, 34, 36, 38, 40.

Each individual current 302, 304, 306, 308, 310 here is connected to its associated control module 252, 254, 256, 258, 260 to provide the local unit for balancing the currents 262, 264, 266, 268, 270 with the current measurement $I_1$, $I_{i-1}$, $I_i$, $I_{i+1}$, $I_q$ of the corresponding output branch 32, 34, 36, 38, 40.

Alternatively, when any control module from among the set of modules 252, 254, 256, 258, 260, for example the module 256 with rank i, comprises a local unit for balancing the currents 266 while not having a unit for internal regulation of the output voltage of the AVP type, which is the case in FIG. 2, the associated branch 36 with rank i comprises two differential measurement taps between the current Ii passing through the branch 36 and the currents $I_{i-1}$, $I_{i+1}$ passing through the two branches 34, 38, respectively associated with the modules 254, 258 adjacent to the module 36.

Each control module 252, 254, 256, 258, 260 comprises an associated single and different adder, to calculate a corrected cyclic ratio $D'_1$, $D'_{i-1}$, $D'_i$, $D'_{i+1}$, $D'_q$, as the sum of the common mode cyclic ratio D and the respective cyclic ratio correction $d_1$, $d_{i-1}$, $d_i$, $d_{i+1}$, $d_q$ determined by the local unit for balancing the corresponding currents 262, 264, 266, 268, 270.

Thus, associating the functions for balancing the branch currents and generating carriers with management of their interleaving in each module makes it possible to reduce the necessary connector technology considerably between the centralized control member and the switching cells. In a case, a single wire bearing the shared common mode cyclic ratio information calculated in the external circuit is necessary. This information is transmitted in the form of voltage.

Figure 3:
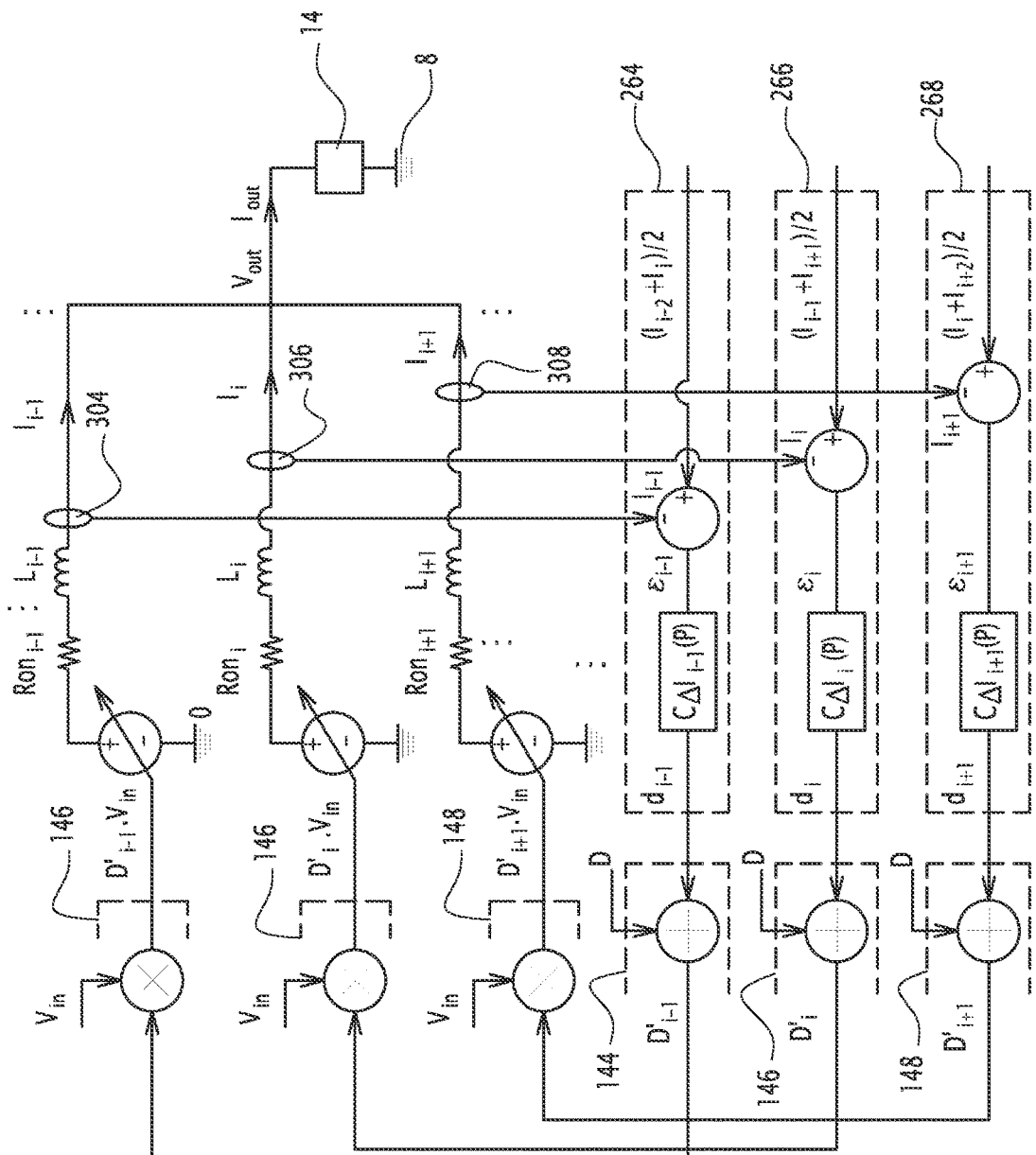
FIG. 3 shows a general diagram for implementing balancing of the branch currents by the local current balancing units currents described in FIG. 2.

According to FIG. 3, a simplified diagram 312 of the static converter 202 of FIG. 2 provides a more detailed illustration of the implementation of balancing of the currents of the output branches by the local units for balancing the currents described in FIG. 2.

Here, only the local units for balancing the currents 264, 266, 268 respectively associated with the control modules 264, 266, 268 with respective rank i−1, i, i+1 are shown.

Each local unit for balancing the currents 264, 266, 268 is configured to respectively determine the locally averaged currents $(I_{i-2}+I_i)/2$, $(I_{i-1}+I_{i+1})/2$, $(I_i+I_{i+2})/2$, from the measurement pair data of the adjacent currents $(I_{i-1}, I_i)$, $(I_{i-1}, I_{i+1})$, $(I_i, I_{i+2})$, respectively surrounding the currents $I_{i-1}$, $I_i$, $I_{i+1}$ and respectively provided by the connecting pairs $(L_{i-2,i-1}; L_{i-1,i})$, $(L_{i-1,i}; L_{i,i+1})$, and $(L_{i,i+1}; L_{i+1,i+2})$.

Each local current balancing unit 264, 266, 268 respectively comprises a single and different subtracter to calculate a difference signal $\epsilon_{i-1}$, $\epsilon_i$, $\epsilon_{i+1}$ with, for a given i:

$$\varepsilon_i = \frac{(I_{i-1} + I_{i+1})}{2} - I_i,$$

$I_i$ being the current passing through the branch associated with the control module with rank i, $I_{i-1}$ and $I_{i+1}$ being the currents passing through the branch associated with the control modules with rank i−1 and i+1, adjacent to the control module with rank i, in terms of positioning in the communication chain 61.

Each local unit for balancing the currents 264, 266, 268 also comprises a single and different conversion filter, characterized by its unique transfer function $C\Delta I_{i-1}(p)$, $C\Delta I_i(p)$ and $C\Delta I_{i+1}(p)$, to convert the difference signal $\epsilon_{i-1}$, $\epsilon_i$, and $\epsilon_{i+1}$ into the corresponding cyclic ratio correction $d_{i-1}$, $d_i$ and $d_{i+1}$.

Each amplified driving unit 144, 146, 148 of the corresponding control module 254, 256, 258 comprises a single and different associated adder, to calculate a corrected cyclic ratio $D'_{i-1}$, $D'_i$, $D'_{i+1}$ respectively equal to $D+d_{i-1}$, $D+d_i$, $D+d_{i+1}$, D designating the shared cyclic ratio provided by the external module 286 for external regulation described in FIG. 1.

According to FIG. 4, the structural implementation of the external regulation of the output voltage and current Vout, Iout by the external loop and module 286, described in FIG. 2, is described in more detail.

As an example, the control module 256 with rank i is partially shown with its amplified driving unit 146 and its local unit for balancing the currents 266.

The interaction interfaces between the amplified driving unit 146, the local unit for balancing the currents 266 and the external module 286 for external output voltage and current regulation are also shown.

The external output voltage Vout regulating module 286 here is traditional in terms of lack of AVP-type external control, and comprises a first subtracter 314 with two positive and negative inputs, respectively designated by the + and − signs, a first filter 316 for converting a common mode error voltage $\epsilon_V$ into a reference current Iref, a second subtracter 318 with two positive and negative inputs, respectively designated by the + and − signs, and a second filter 320 for converting a common mode error current $\epsilon_I$ into the common mode cyclic ratio D of the switching cells 22, 24, 26, 28 and corresponding output branches.

The structure of the local unit for balancing the currents 266 is identical to that described in FIG. 3, the subtracter for calculating the local differential current signal $\epsilon_i$, and the conversion filter, characterized by its unique transfer function $C\Delta I_i(p)$, to convert the differential current signal $\epsilon_i$ into the corresponding cyclic ratio correction $d_i$, respectively designated by numerical references 326, 336.

The amplified driving unit structure 146 is identical to that described in FIG. 3, the adder for calculating the corrected cyclic ratio $D'_i$, equal to $D+d_i$, here being designated by numerical reference 346, and having first and second input terminals, designated by a different + sign. The first input terminal is connected to the external regulating unit 286 to receive the shared cyclic ratio D, while the second input terminal is connected to the local unit for balancing the currents 266 to receive the cyclic ratio correction $d_i$ corresponding to the control module with rank i.

When the external regulating module 286 is working, the first subtracter 314 calculates the difference between the predetermined reference voltage Vref and the output voltage Vout measured by the measuring tap 281. This difference forming the common mode error voltage $\epsilon_V$ is converted into a reference current Iref by the first conversion filter 316 characterized by a transfer function denoted $C_V(s)$.

The reference current signal Iref and the signal of the output current Iout of the converter, measured by the current tap 282, are respectively injected at the positive input terminal and the negative input terminal of the second subtracter 318.

The second subtracter 318 calculates the difference (Iref−Iout) between the reference current signal Iref and the output current signal Iout, to form the common mode error current $\epsilon_I$. The common mode error current $\epsilon_I$ is converted into the common mode cyclic ratio D by the second conversion filter 320 characterized by a transfer function denoted $C_I(s)$.

Alternatively, the external regulating unit 286 has no internal control of the AVP type, and the external regulation done is either an external output voltage regulation based on the measurement of the output voltage, or an external output current regulation based on the measurement of the output current.

According to FIG. 5, an alternative structural embodiment of the external regulation of the output voltage and current Vout, Iout described in FIG. 4 is shown in which the traditional external module 286 is replaced by an external regulating module 386 of the AVP type.

Like the external regulating module 286, the external module 386 identically comprises the first subtracter 314 with two inputs and the second subtracter 318 with two inputs.

The external regulating module 386 comprises a first filter 396 for converting the common mode error voltage $\epsilon_V$ into a reference current Iref, identically connected to the first filter 316 between the first subtracter 314 and the second subtracter 318, and the transfer function of which $C_V(s)$ here is a particular function of the proportional type having a gain equal to 1/R, R being a first predetermined constant.

The external regulating module 386 comprises a second filter 397 for converting a common mode error current $\epsilon_I$ into the common mode cyclic ratio D of the output branches, connected identically to the second filter 316 between the second subtracter 318 and the output terminal designed to provide the same common mode cyclic ratio D to the adders of the driving unit, in particular the adder 346 shown in FIG. 5. The transfer function $C_I(s)$ characterizing the second filter 397 here is a particular function of the integrator type equal to 1/Cp, in which p designates the Laplace operator, and C designates a second predetermined constant.

The external regulating module 386 also comprises a proportional circuit 398 with slope factor α to create, as output, a current correcting source α·Iout at the negative input of the second subtracter 318. The proportional circuit 398 with slope factor α is shown here by a multiplier 398, connected to the output current tap 282 by a first input 400 and the slope factor α of which is set by being injected at a second input 402.

Figure 6:
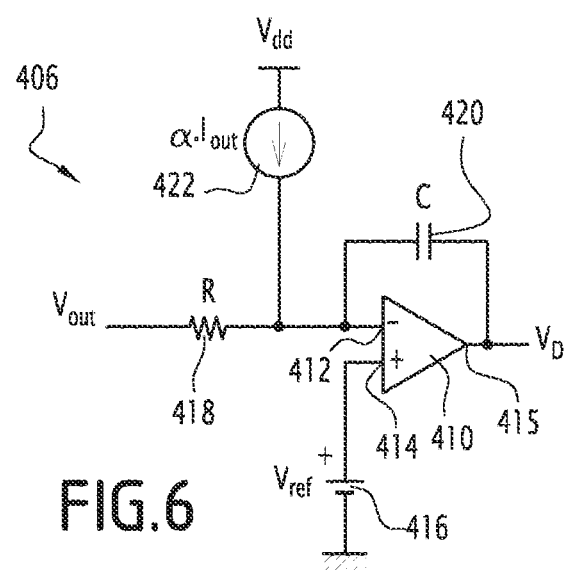
FIG. 6 is a view of the embodiment of the external module for external regulation of the AVP type, described in FIG. 5, using an operational amplifier.

In FIG. 6, the external regulating module described in FIG. 5 is for example made by an electronic circuit 406, the core of which is an operational amplifier 410 having a first negative input 412 for input voltage, a second positive input 414 for input voltage, and an output terminal 415.

The electronic circuit 406 comprises a regulated reference voltage Vref source 416, connected to the second positive terminal 414, and an input resistance 418 with value R having a first end connected to the first negative terminal 412 and a second end connected to the tap for measuring the output voltage to receive the corresponding measurement signal Vout.

The electronic circuit 406 also comprises a capacitance 410 with value C, connected in feedback between the output terminal 415 and the first negative terminal 412 of the operational amplifier 410, and a current generator α·Iout linearly modulated by the output current Iout, i.e., the current of the load 14, with the slope factor α.

In static operating conditions, the output voltage Vout verifies the relation:

$$V_{out} = V_{ref} - \alpha \cdot R \cdot I_{out} \quad \text{(relation 1)}$$

In dynamic operating conditions, the voltage $V_D$, representative of the common mode cyclic ratio D, verifies the relation:

$$V_D(p) = -\frac{1}{C \cdot p} \cdot \frac{V_{out}(p)}{R} - \frac{1}{C \cdot p} \cdot \alpha \cdot I_{out}(p), \quad \text{(relation 2)}$$

in which p designates the Laplace operator.

Figure 7:
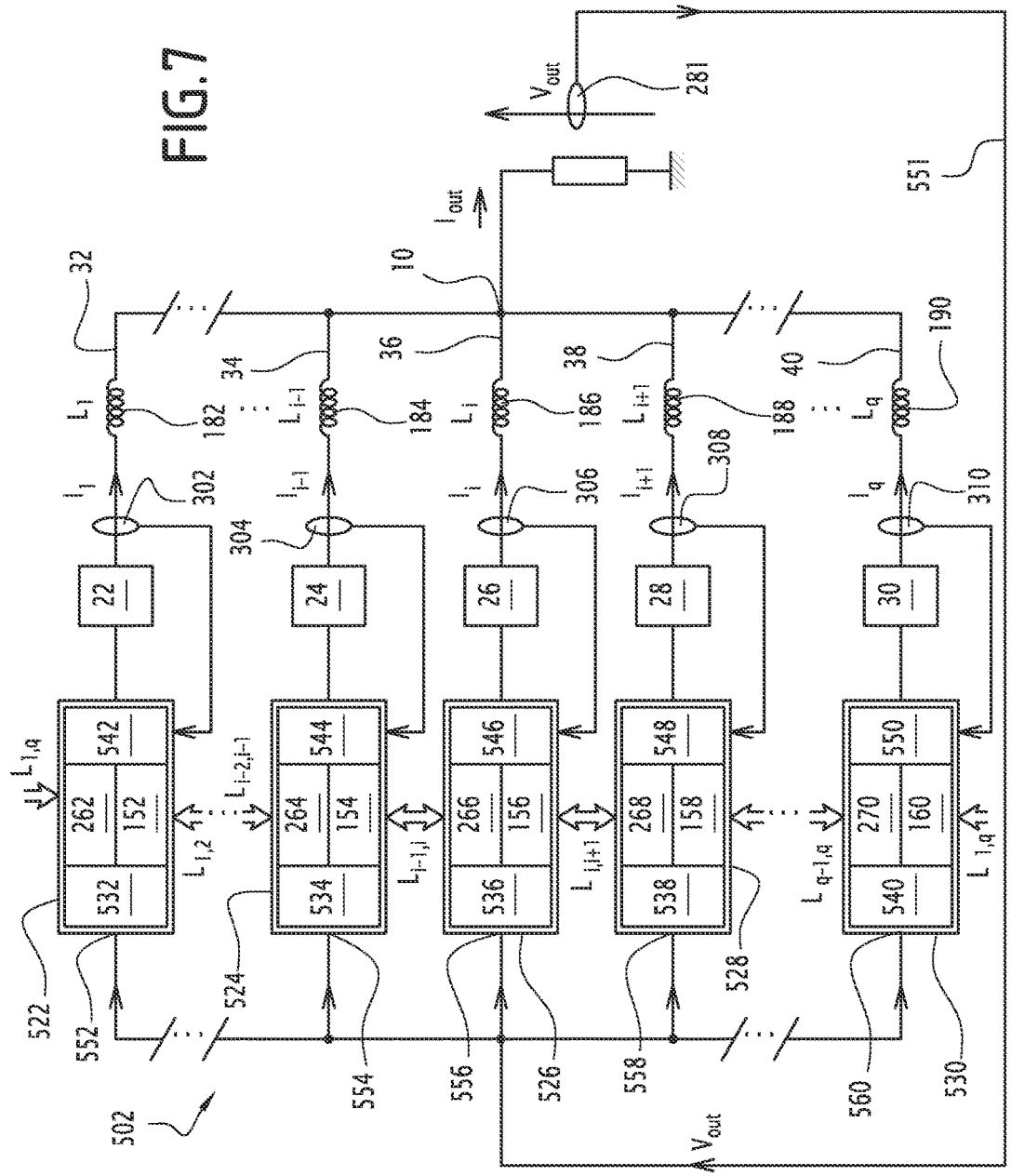
FIG. 7 shows a third embodiment of the static converter with parallel architecture and DMC, derived from the first embodiment described in FIG. 2, and in which each control module has a local internal regulation unit of the AVP type for controlling the interleaving of the commands and a local unit for balancing the currents of the outputs.

In FIG. 7, a third embodiment 502 of the DMC of the static converter according to the invention is derived from the first environment described in FIG. 2 for which components identical to those described in FIG. 1 bear the same numerical references.

The static converter 502 comprises control modules 522, 524, 526, 528, 530 that respectively replace the control modules 252, 254, 256, 258, 260 described in FIG. 2 and are respectively associated with the output branches 32, 34, 36, 38, 40.

Like the static converter 202 of FIG. 2, each control module 522, 524, 526, 528, 530 respectively comprises the same local unit 152, 154, 156, 158, 160 for generating a unique triangular voltage carrier, and the same local unit for balancing the branch currents 262, 264, 266, 268, 270.

Unlike the static converter 202 of FIG. 2, each control module 522, 524, 526, 528, 530 comprises a local unit 532, 534, 536, 538, 540 for internal regulation of the output voltage, of the AVP type, and an amplified driving unit 542, 544, 546, 548, 550 that differs from the amplified driving unit 142, 144, 146, 148, 150 of FIG. 2.

Unlike the static converter 202 of FIG. 2, the amplified driving units 542, 544, 546, 548, 550 are the amplified driving units 142, 144, 146, 148, 150 of FIG. 2, in which the input adder has been removed.

Unlike the static converter 202 of FIG. 2, the main loop 280 for external common mode regulation of the output voltage Vout and current Iout and the external module 286 for external regulation are removed and replaced by a plurality of internal local regulations of the AVP type, implemented internally in the control modules 522, 524, 526, 528, 530.

The limitation of the internal local regulations, however, requires the distribution to all of the control modules of the information related to the output voltage for the converter 502 taken by the measuring tap 281.

To that end, the converter comprises a network forming a bus 551 for supplying output voltage information Vout to each of the control modules 522, 524, 526, 528, 530 in a single and different respective input terminal 552, 554, 556, 558, 560.

Each local unit for internal regulation of the output voltage of the AVP type 532, 534, 536, 538, 540 respectively comprises a single and different internal voltage regulating loop of the AVP type, configured to determine a unique cyclic ratio $D_1$, $D_{i-1}$, $D_i$, $D_{i+1}$, $D_q$ from the measurement of the output voltage Vout, the measurement of the respective output current $I_1$, $I_{i-1}$, $I_i$, $I_{i+1}$, $I_q$ passing through the corresponding output branch 32, 34, 36, 38, 40, the reference voltage Vref, and a corrected unique slope factor $\alpha_1$, $\alpha_{i-1}$, $\alpha_i$, $\alpha_i$ and $\alpha_q$.

Each corrected slope factor $\alpha_1$, $\alpha_{i-1}$, $\alpha_i$, $\alpha_i$ and $\alpha_q$ is proportional to the product of a predetermined reference main slope factor $\alpha d_1$ and the respective cyclic ratio $d_{i-1}$, $d_i$, $d_{i+1}$, $d_q$, determined by the local unit for balancing the corresponding currents 262, 264, 266, 268, 270, according to a proportionality factor independent of the rank i of the control module.

Each unique cyclic ratio Di associated with the control module, i varying from 1 to q, depends on the difference between a reference current Iref and the product $\alpha_i \cdot I_i$ of the slope correction factor $\alpha_i$ and the measured value of the current $I_i$ of the output branch, the reference current Iref being proportional to the difference between the reference voltage Vref and the value of the output voltage Vout measured according to a proportionality constant 1/R, substantially identical over all of the control modules.

Figure 8:
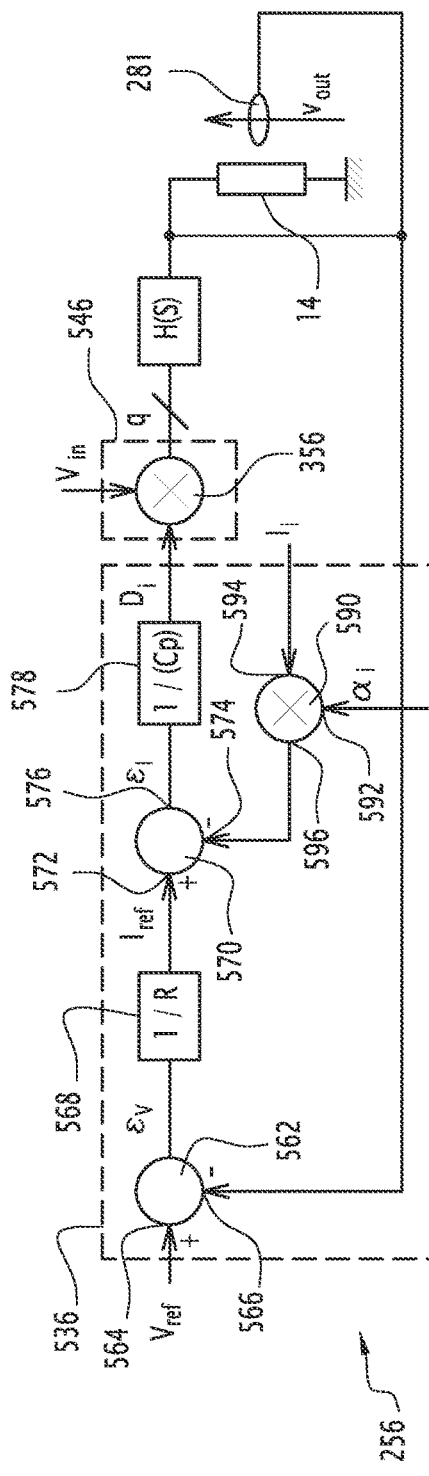
FIG. 8 is a diagram of the implementation, by the static parallel architecture converter with DMC of FIG. 7 and for each control module, of the internal local regulation of the AVP type coupled with local balancing of the branch currents.

In FIG. 8, the structural implementation of the internal local regulations of the output voltage Vout by the local units 532, 534, 536, 538, 540 for internal regulation of the output voltage, of the AVP type, is described in more detail.

As an example and to simplify FIG. 8, only the control module 526 with rank i is partially shown with its amplified driving unit 546, its local unit for balancing the currents 266, and its local unit 536 for internal regulation of the output voltage Vout.

The interaction interfaces between the amplified driving unit 546, the local unit for balancing currents 266 and the local unit 536 for internal regulation of the output voltage Vout are also shown.

The structure of the local unit for balancing the currents 266 is identical to that described in FIGS. 4 and 5.

The amplified driving unit structure 546 is identical to that described in FIGS. 4 and 5.

The local unit 536 for internal regulation of the output voltage comprises, connected in series, a first subtracter 562 with two positive 564 and negative 566 inputs respectively marked by + and − signs in FIG. 8, a first conversion filter 568 of the proportional type for converting a common mode error voltage $\epsilon_V$ into a reference current Iref, a second subtracter 570 with two positive 572 and negative 574 inputs, respectively marked by the + and − signs, and an output terminal 576, and a second filter 320, of the integrator and conversion type for converting a common mode error current $\epsilon_I$ into the cyclic ratio Di specific to the module with rank i.

The transfer function of the first proportional-type filter 568 is written 1/R, R being a predetermined constant.

The transfer function of the second integrator-type filter 578 is written 1/Cp, C being a predetermined constant and p being the Laplace operator.

The local unit 536 for internal regulation of the output voltage also comprises a proportional circuit 580 for modulation of a mean slope factor α to create a corrected slope factor with value $\alpha_i$ as output. In practice, the proportional circuit 580 is a constant-gain amplifier a, connected at its input to the output of the local unit for balancing the currents 266. In FIG. 8, the proportional circuit 580 is shown by a first multiplier 580 having a first input 582 connected to the local unit for balancing the currents 266, a second input 402 for receiving the set mean slope factor a, and an output terminal 586.

The local unit 536 for internal regulation of the output voltage also comprises a second multiplier 590 having a first input terminal 592 connected to the output terminal 586 of the proportional circuit 580, a second input terminal 594 connected to the measurement tap for the current $I_i$ passing through the branch with rank i, and an output terminal 596 connected to the negative terminal 574 of the second subtracter 570.

When the local unit 536 for internal regulation is working, the first subtracter 562 calculates the difference between the predetermined reference voltage Vref and the output voltage Vout measured by the voltage measuring tap 281. This difference forming the common mode error voltage $\epsilon_V$ is converted into a reference current Iref by the first conversion filter 568, characterized by its transfer function 1/R.

The local unit for balancing the currents 266 with rank i delivers a slope correction signal Vctr(i) that is next multiplied by the mean slope factor $\alpha$ to create a corrected slope factor with value $\alpha_i$ as output of the first multiplier 580.

The second multiplier 590 that receives the value of the corrected slope factor $\alpha_i$ and the value of the current $I_i$ passing through the branch with rank i calculates the product $\alpha_i \cdot I_i$, that product being provided to the second subtracter 570.

The local unit 536 for internal regulation of the output voltage is for example made by an electronic circuit with the same structure as that described in FIG. 6. The core of the circuit is an operational amplifier having a first negative input voltage terminal, a second positive input voltage terminal, and an output terminal.

The electronic circuit comprises a regulated reference voltage Vref source, connected to the second positive terminal, and an input resistance with value R having a first end connected to the first negative terminal and a second end connected to the tap for measuring the output voltage to receive the corresponding measurement signal Vout.

The electronic circuit also comprises a capacitance with value C, connected in feedback between the output terminal and the first negative terminal of the operational amplifier, and a generator for generating current $\alpha_i \cdot I_i$ linearly modulated by the current $I_i$ passing through the branch with rank i. The corrected slope factor $\alpha_i$ depends on a mean slope factor $\alpha$ shared by all of the modules and a slope correction factor Vctr(i) specific to the module with rank i. The slope correction factor Vctr(i) depends on the local balancing of the current $I_i$ passing through the branch with rank i with its two adjacent currents $I_{i-1}$, $I_{i+1}$ passing through the branches with rank i−1 and i+1.

In static operating conditions, the output voltage Vout verifies the relation:

$$V_{out} = V_{ref} - \alpha_i \cdot R \cdot I_i \quad \text{(relation 3)}$$

In dynamic operating conditions, the voltage $V_{Di}$, representative of the common mode cyclic ratio $D_i$, verifies the relation:

$$V_{Di}(p) = -\frac{1}{C \cdot p} \cdot \frac{V_{out}(p)}{R} - \frac{1}{C \cdot p} \cdot \alpha_i \cdot I_i(p) \quad \text{(relation 4)}$$

in which p designates the Laplace operator.

Figure 9:
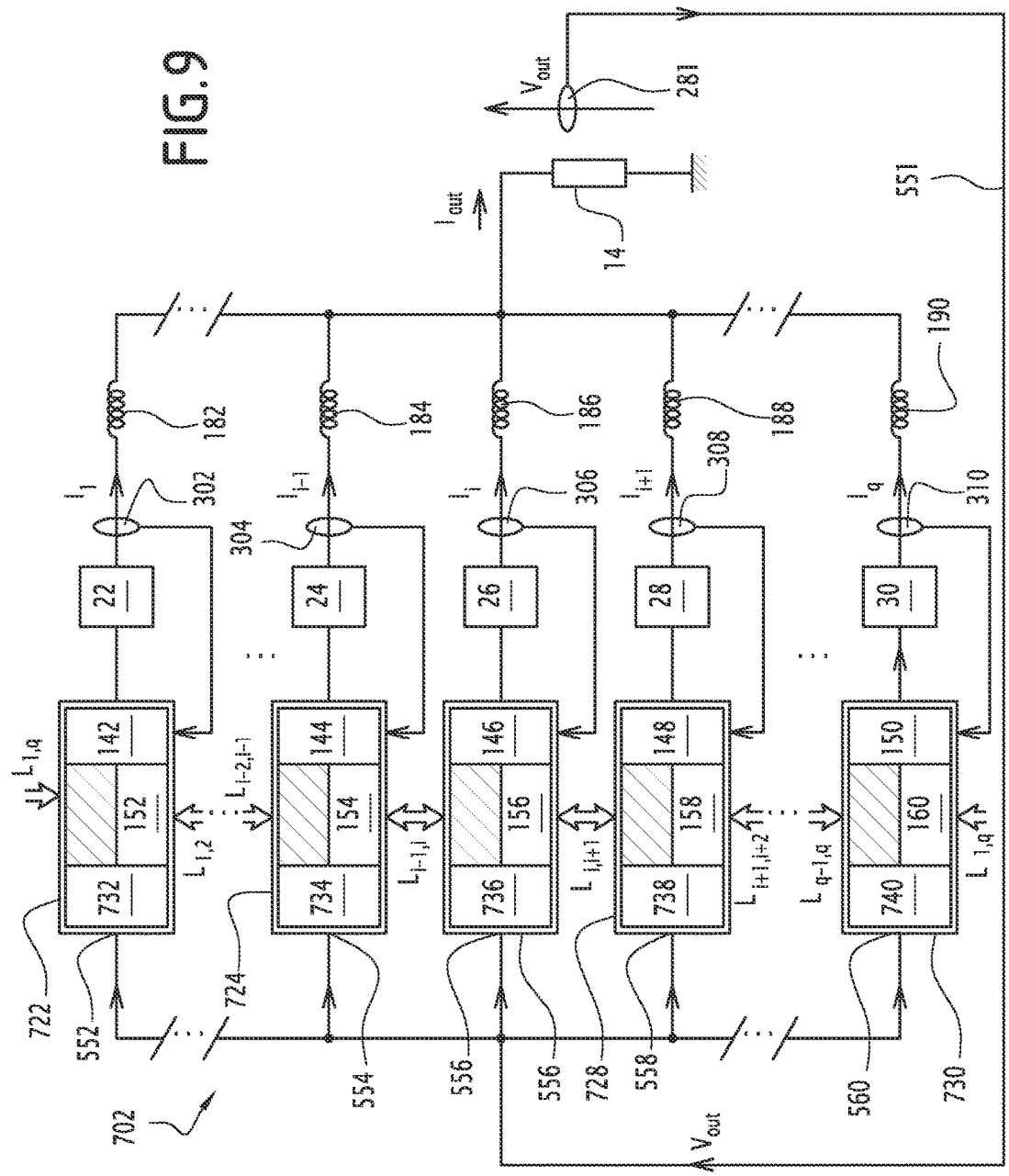
FIG. 9 is a view of a fourth embodiment of the converter with parallel architecture, derived from the first embodiment of FIG. 2 and the third embodiment of FIG. 7, in which each control module has an internal unit for regulating the output voltage of the AVP type while not having a local unit for balancing the branch currents.

In FIG. 9, a fourth embodiment 702 of the DMC of the static converter according to the invention, derived from the third embodiment described in FIG. 7, is shown in which the components identical to those described in FIG. 7 bear the same numerical references.

The static converter 702 comprises control modules 722, 724, 726, 728, 730 that respectively replace the control modules 522, 525, 526, 528, 530, respectively associated with the output branches 32, 34, 36, 38, 40.

Like the static converter 502 of FIG. 7, each control module 722, 724, 726, 728, 730 respectively comprises the same local unit 152, 154, 156, 158, 160 for generating a unique triangular voltage carrier, and the same amplified driving unit 542, 544, 546, 548, 550.

Like the static converter 502 of FIG. 7, the implementation of the internal local regulations of the AVP type requires the distribution to all of the control modules 722, 724, 726, 728, 730, by the bus 551, of the information related to the output voltage Vout of the converter 702 taken by the measuring tap 281.

Unlike the static converter 502 of FIG. 7, each control module 722, 724, 726, 728, 730 has no local unit for balancing the currents and comprises a local unit 732, 734, 736, 738, 740 for internal regulation of the output voltage, of the AVP type.

Each unit for internal regulation of the output voltage of the AVP type 732, 734, 736, 738, 740 respectively comprises a single and different internal voltage regulating loop of the AVP type configured to determine a unique cyclic ratio $D_1$, $D_{i-1}$, $D_i$, $D_{i+1}$, $D_q$ from the measurement of the output voltage Vout, the measurement of the respective output current $I_1$, $I_{i-1}$, $I_i$, $I_{i+1}$, $I_q$ passing through the corresponding output branch 32, 34, 36, 38, 40, the reference voltage Vref, and a unique slope factor $\alpha_1$, $\alpha_{i-1}$, $\alpha_i$, $\alpha_i$ and $\alpha_q$, substantially equal to a same predetermined mean slope factor $\alpha$ value.

Each unique cyclic ratio Di, associated with a control module, with i varying from 1 to q, depends on the difference between a reference current Iref and the product $\alpha_i \cdot I_i$ of the slope factor $\alpha_i$ substantially equal to $\alpha$ and the measured value of the current $I_i$ of the branch, the reference current Iref being proportional to the difference between the reference voltage Vref and the value of the output voltage Vout measured according to a proportionality constant 1/R, substantially identical on all of the control modules.

Thus and by nature, the voltage regulation of the AVP type at each branch offers natural balancing of the currents of the branches. It is, however, possible for slight disparities between the values of the components of the electronics of each module to cause slight deviations on the branch currents. If these deviations are tolerable (case of converters with inductors not coupled to each other), the association in each module of the AVP-type output voltage regulating function and the function for carrier generation with management of the interleaving thereof makes it possible to obtain completely decentralized control of a parallel converter comprising any number q of switching cells. There is then no longer any need for a centralized control member.

Figure 10:
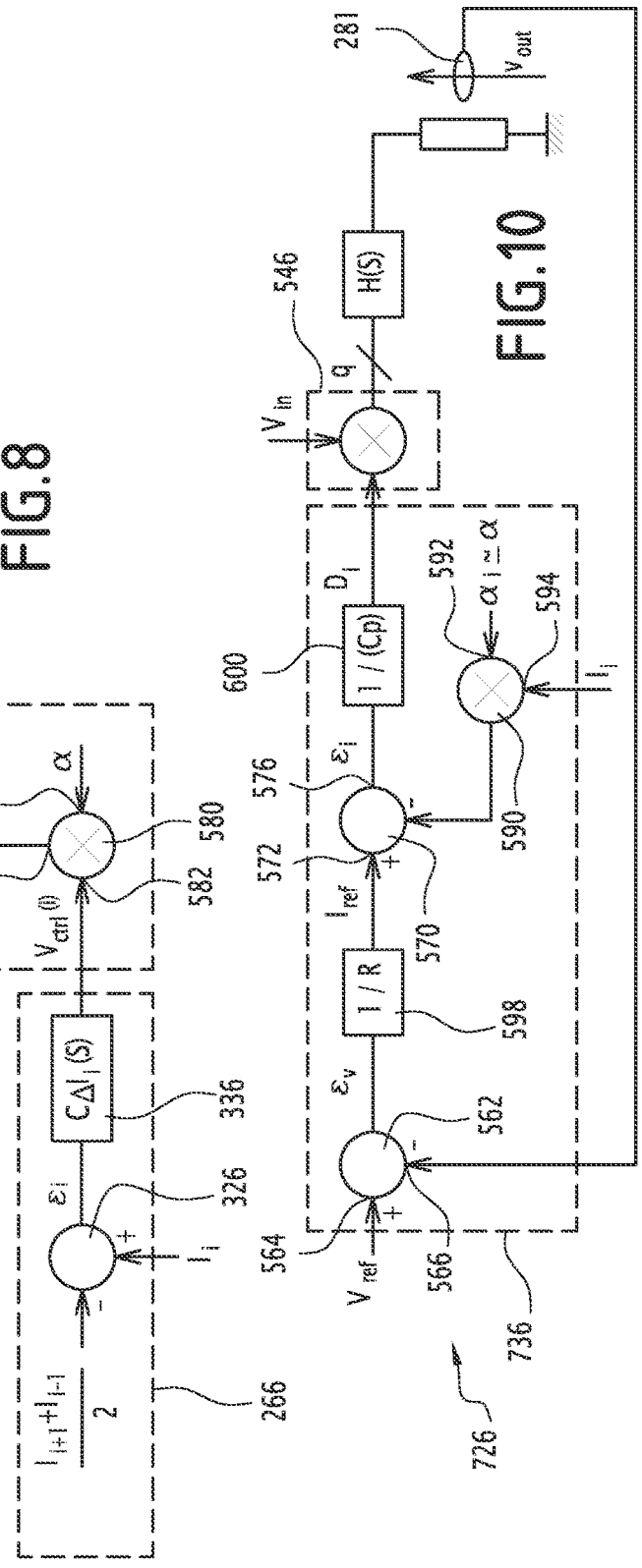
FIG. 10 is a diagram of the implementation of the local internal voltage regulations of the AVP type described in FIG. 9.

According to FIG. 10, the structural implementation of the internal local regulations of the output voltage Vout by the local units 732, 734, 736, 738, 740 for internal regulation of the output voltage, of the AVP type, is described in more detail.

As an example and in order to simplify FIG. 10, only the control module 726 with rank i is partially shown with its amplified driving unit 546, and its local unit 736 for internal regulation of the output voltage.

The interaction interfaces between the amplified driving unit 546 and the local unit 536 for internal regulation of the output voltage Vout are also shown.

The local unit 736 for internal regulation of the output voltage of the AVP type is the local unit for internal regulation of the output voltage of the AVP type 536 of FIG. 8 in which the proportional circuit, i.e., the first multiplier 580 connected to a local unit for balancing currents, has been removed.

The multiplier 590 becomes the single multiplier in which the first input terminal 592 receives the set point specific to the slope factor $\alpha_i$ substantially equal to the single mean slope factor $\alpha$, and in which the second input terminal 594 is connected to the measuring tap 306 for the current $I_i$ passing through the output branch with rank i.

When the local unit 736 for internal regulation is working, the first subtracter 562 calculates the difference $\epsilon_V$ between the predetermined reference voltage Vref and the output voltage Vout measured by the voltage measuring tap 281. This difference $\epsilon_V$ forming the common mode error voltage is converted into a reference current Iref by the first conversion filter 568, characterized by its transfer function 1/R.

The multiplier 590 that receives the value of the setpoint slope value $\alpha_i$ substantially equal to the value $\alpha$ shared by all of the control modules, and which receives the value of the current $I_i$ passing through the branch with rank i, calculates the product $\alpha \cdot I_i$, that product being provided to the second subtracter 570.

The local unit 736 for internal regulation of the output voltage is for example made by an electronic circuit with the same structure as that described in FIG. 6. The core of the circuit is an operational amplifier having a first negative input voltage terminal, a second positive input voltage terminal, and an output terminal.

The electronic circuit comprises a regulated reference voltage Vref source, connected to the second positive terminal, and an input resistance with value R having a first end connected to the first negative terminal and a second end connected to the tap for measuring the output voltage to receive the corresponding measurement signal Vout.

The electronic circuit also comprises a capacitance with value C, connected in feedback between the output terminal and the first negative terminal of the operational amplifier, and a generator for generating current $\alpha \cdot I_i$ linearly modulated by the current $I_i$ passing through the branch with rank i.

In static operating conditions, the output voltage Vout verifies the relation:

$$V_{out} = V_{ref} \cdot \alpha \cdot R \cdot I_i \quad \text{(relation 5)}$$

In dynamic operating conditions, the voltage $V_D$, representative of the common mode cyclic ratio D, verifies the relation:

$$V_D(p) = -\frac{1}{C \cdot p} \cdot \frac{V_{out}(p)}{R} - \frac{1}{C \cdot p} \cdot \alpha \cdot I_i(p) \quad \text{(relation 6)}$$

in which p designates the Laplace operator.

FIG. 11 shows one example embodiment of an automatic reconfiguration of the communication chain between modules, applied to the triangular carrier generating function.

A control module 856 with rank i having such an automatic reconfiguration function comprises a generating unit 860 for generating the triangular carrier signal tr(i) of the module 856, and an amplified driving unit 862 of the associated switching cell 26.

The control module 856 comprises a first port 864 with input/output terminals and a second port 866 with input/output terminals respectively connected to the communication link $L_{i-1,i}$ and the communication link $L_{i,i+1}$.

The first terminal port 864 comprises a first output terminal 868 designed to deliver the triangular carrier signal, denoted tr(i), generated by the carrier generating unit 860 of the module with rank i, and a second input terminal 870 designed to receive the triangular carrier signal, denoted tr(i−1), generated by the carrier generating unit of the adjacent module with preceding rank i−1.

The second terminal port 866 comprises a third input terminal 872 designed to receive the triangular carrier signal, denoted tr(i+1), generated by the carrier generating unit of the adjacent module with the following rank i+1, and a fourth input terminal 874 designed to deliver the triangular carrier signal tr(i), generated by the carrier generating unit 860 of the module with rank i.

The control module comprises a fifth output terminal 876, connected to the amplified driving unit 862 and the associated switching cell 26, and through which the control signal of the switching cell 26 is conveyed.

The amplified driving unit 862 comprises a first input terminal 878 to receive the triangular carrier signal tr(i), generated by the carrier generating unit 860 of the module 856 with rank i, a second input terminal 880 to receive a signal denoted En for activating/deactivating the amplified driving unit 862, and a third output terminal 882 for the command of the switching cell connected to the fifth terminal 876.

The unit 860 for generating the triangular carrier signal tr(i) of the module 856 comprises a first input terminal 884, connected to the external terminal 870 to receive the triangular carrier signal tr(i−1), a second input terminal 886 connected to the external terminal 8872 to receive the triangular carrier signal tr(i+1), and a third output terminal 890, connected to the input terminal 878 of the amplified driving unit 862 to provide it with the triangular carrier signal tr(i), generated by the carrier generating unit 860.

The control module comprises means 892, 894 for connecting/disconnecting the first port 864 and the second port 866 from/to the triangular carrier generating unit 860 of the module with rank i, and in parallel for connecting/disconnecting the two ports with respect to each other.

Here, the connection/disconnection means 892, 894 comprise a first switch 882 and a second switching 884, each having one input/two outputs and having two inverse command contacts.

The input 895 of the first switch 892 is connected to the first external terminal 868, the first output 896 being connected to the output terminal 890 and the second output terminal 897 being connected to the external terminal 872.

The input 898 of the second switch 894 is connected to the fourth external terminal 874, the first output 900 being connected to the output terminal 890 of the generating unit 860 and the second output terminal 902 being connected to the external terminal 874.

When an activation command through a signal denoted En, generated inside or outside the module, is sent to the first and second switches 892, 894, connections are respectively established between the terminals 864, 884 and the terminals 874, 890 while the connections are respectively interrupted between the terminals 868, 872, and between the terminals 870, 874.

When a deactivation command through the signal denoted En in the inverse state, generated inside or outside the module, is sent to the first and second switches 892, 894, the connections are respectively established between the terminals 868, 872, and between the terminals 870, 874, while the connections are interrupted between the terminals 864, 884 and between the terminals 874, 890.

In general, any module with rank i, with i comprised between 1 and q, comprises a first connection port and a second connection port that are configured to be connected externally to a first communication link and a second communication link.

Each module with rank i comprises means for disconnecting/connecting the connection ports from/to the local units, and in parallel connecting/disconnecting the two ports relative to one another, the switching between a first state in which the ports are connected to the local units and the ports are disconnected with respect to one another, and a second state in which the ports are disconnected from the local units and the ports are connected to one another, being implemented by a command signal outside the module or by an internal command signal developed within the module.

Thus, the arrangement of the modules in a chained configuration with respect to one another offers the possibility of changing the number of modules easily. It is in fact possible to remove a module from the chain by connecting its neighbors to each other. This property may prove particularly interesting in the event a defect appears in a switching cell of the converter.

An identical device is also used to manage communications of the values of the branch currents between modules.

FIG. 12 shows one particular embodiment of a control module 902 having any rank i.

The control module 902 is respectively connected to its two adjacent modules, not shown in the Figure and with ranks i−1 and i+1, through the corresponding communication links $L_{i-1,i}$, $L_{i,i+1}$.

Here, the control module 902 with rank i comprises a local unit 906 for generating a unique triangular voltage carrier, a local unit for balancing the currents 908 and an amplified driving unit 910, while not having the local unit for internal regulation of the output voltage of the AVP type.

The control module 902 comprises a first connection port 904 for connecting to the control module with the preceding rank i−1 through the communication link $L_{i-1,i}$, and a second connection port 906 for connecting to the control module with the following rank i+1 through the communication link $L_{i,i+1}$.

The first connection port 904 comprises a first output terminal 912 to provide the triangular carrier signal tri(i) of the module 902 with rank i to the control module with preceding rank i−1, a second input terminal 914 for receiving the triangular carrier signal tri(i−1) coming from the adjacent control module with rank i−1, a third input terminal 916 for receiving the measurement of the current $I_{i-1}$ passing through the output branch with rank i−1, a fourth output terminal 918 for transmitting the current measurement $I_i$ passing through the output branch with rank i.

The second connection port 906 comprises a fifth output terminal 920 for transmitting the triangular carrier signal tri(i) of the module 902 with rank i to the control module with the following rank, a sixth input terminal 922 for receiving the triangular carrier signal tri(i+1) of the adjacent module with the following rank i+1, a seventh input terminal 924 for receiving the current measurement $I_{i+1}$ passing through the output branch with rank i+1, an eighth output terminal 926 for transmitting the current measurement i passing through the output branch with rank i.

The control module 902 also comprises a ninth input terminal 928 connected to the measurement tap for measuring the current $I_i$ passing through the branch with rank i.

Alternatively, the control module with rank i comprises a local unit for internal regulation of the output voltage of the AVP type coupled to a local unit for balancing the currents.

Alternatively, the control module with rank i has no local unit for balancing the currents and comprises a local unit for internal regulation of the output voltage of the AVP type having a slope factor with substantially the same value α over all of the modules.

It should be noted that for each control module with rank i, the measurement of an individual current $I_i$ passing through the associated branch with rank i must be provided to the module i.

More generally, each module with any rank i, the two modules adjacent to that module and having ranks i−1 and i+1, and the corresponding communication links $L_{i-1,i}$, $L_{i,i+1}$ are configured to exchange relevant information relative to and intended for the module with any rank i chosen from among the current $I_i$ of the branch with rank i, the currents $I_{i-1}$, $I_{i+1}$ of the adjacent branches with rank i−1, i+1 (or the differential currents $I_i-I_{i-1}$ and $I_{i+1}-I_i$), the triangular carrier signals of the module with any rank i and modules adjacent to that module with rank i−1, i+1. The obtained connector technology is due to the fact that each module exchanges information on its branch current and its triangular carrier with the modules adjacent to it.

Figure 13:
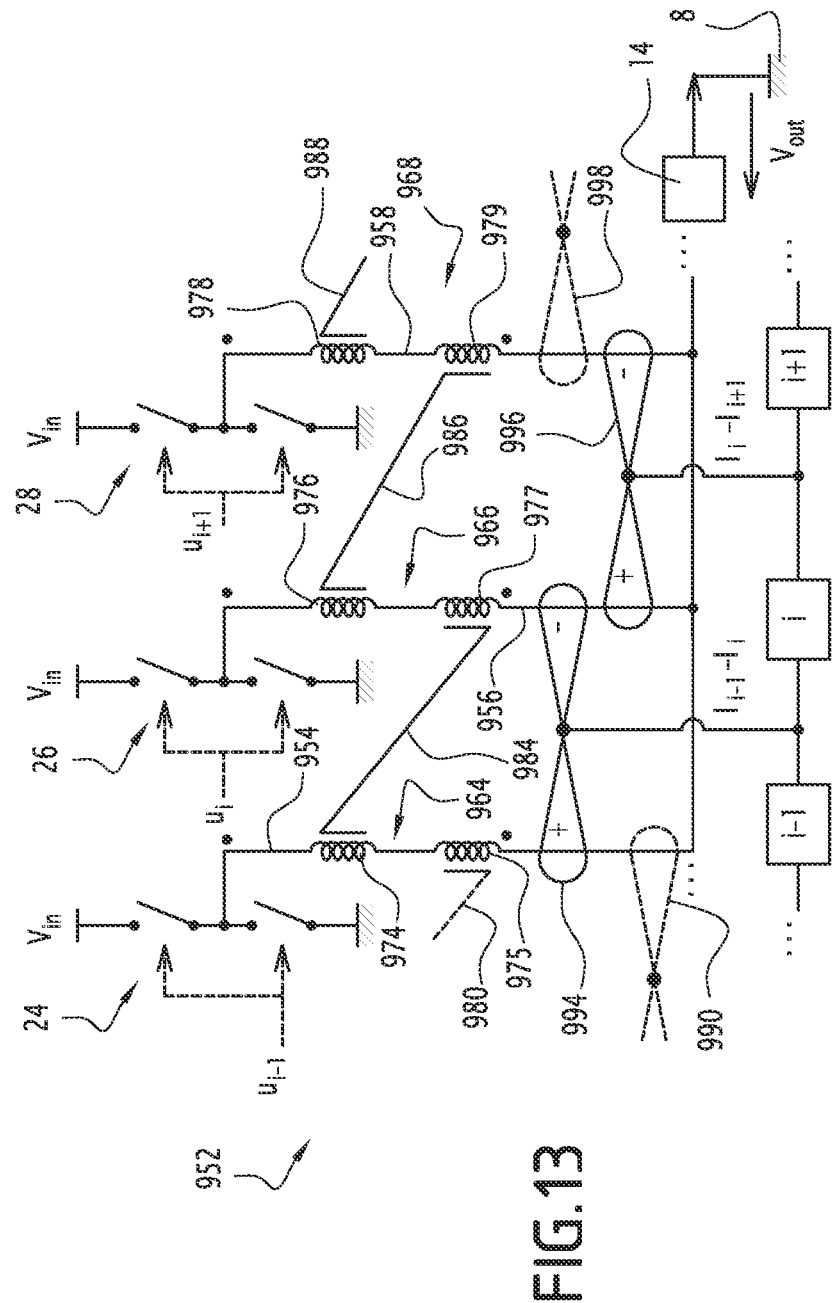
FIG. 13 is a view of one particular configuration of output smoothing inductors of the branches in which magnetic couplings are used, and a differential measurement mode for the currents of two adjacent output branches.

One particular configuration embodiment of the smoothing inductors and measurements of the current passing through the output branches is described relative to FIG. 13.

A static converter with parallel architecture 952 implementing such a configuration comprises output branches 954, 956, 958 with coupled inductors, only three being shown in FIG. 13.

Each output branch 954, 956, 958 is associated with and connected at its input to a different switching cell 24, 26, 28 supposed to be associated with rank i−1, i+1 within the communication chain.

The output branches 954, 956, 958 are connected at the output to a same input terminal of the load 14.

Each output branch 954, 956, 958 respectively comprises a first winding 974, 976, 978 and a second winding 975, 977, 979 connected in series forming a first inductor and a second smoothing inductor.

The first winding and the second winding of the same output branch are uncoupled with respect to one another in terms of magnetic flux, but are wound in the opposite direction in terms of flow direction of the current.

The first winding of an output branch having any rank i is coupled in terms of magnetic flux to the second adjacent output branch winding with the next rank through a single and different magnetic flux coupling element.

Here, only four magnetic flux coupling elements 980, 984, 986, 988 are shown, respectively corresponding to the magnetic flux coupling of the second winding 975 with the first winding (not shown) of the branch with rank i−2, the first winding 974 of the branch with rank i−1 with the second winding 977 of the branch with the following rank i, the first winding 976 of the branch with rank i with the second winding 979 of the branch with following rank i+1, the first winding 978 of the branch with rank i+1 with the second winding (not shown) of the branch with the following rank i+2.

The static converter with parallel architecture 952 comprises differential current measuring sensors 990, 994, 996, 998 of the Fluxgate type, i.e., for measuring a flux of two current lines flowing in opposite directions with respect to one another, positioned at the output of two adjacent output branches.

The differential current measuring sensors 990, 994, 996, 998, which alone are shown in FIG. 13, are configured here to respectively provide the differential current measurements $I_{i-2}-I_{i-1}$, $I_{i-1}-I_i$, $I_i-I_{i+1}$, $I_{i+1}-I_{i+2}$.

Each local unit for balancing the currents with rank i is configured to calculate $$\varepsilon_i = \frac{(I_{i-1} + I_{i+1})}{2} - I_i$$

from two differential measurements $(I_{i-1}-I_i)$ and $(I_i-I_{i+1})$.

This configuration and its advantages are described in the article by Mathieu Le Bolloch, Marc Cousineau and Thierry Meynard entitled "New Materless Moduar Current-Sharing Technique for D/DC Parallel Converters" EPE-PEMC 2010, 14th International Power Electronics and Motion Conference, Ohrid Republic of Macedonia, 6-8 Sep. 2010.

This solution improves the output filtering performance when possible, i.e., when the static converter does not comprise internal local regulations and when the installation of the switching cells, smoothing inductors and current sensors allows it.

In general, each output branch comprises one or more smoothing inductors.

The smoothing inductors of two branches of any two adjacent modules can be coupled, as chosen, as described in FIG. 13, or not coupled; each control module comprises a local unit for balancing the currents.

Thus, in the case of a converter using inductors coupled to each other, associating the functions for balancing the branch currents and generating carriers with management of their interleaving in each module makes it possible to reduce the necessary connector technology considerably between the centralized control member and the switching cells. It may be noted that balancing of the currents based on measuring the differences of the branch currents makes it possible to equalize the values of those currents without requiring the use of a high precision sensor.

Figure 14:
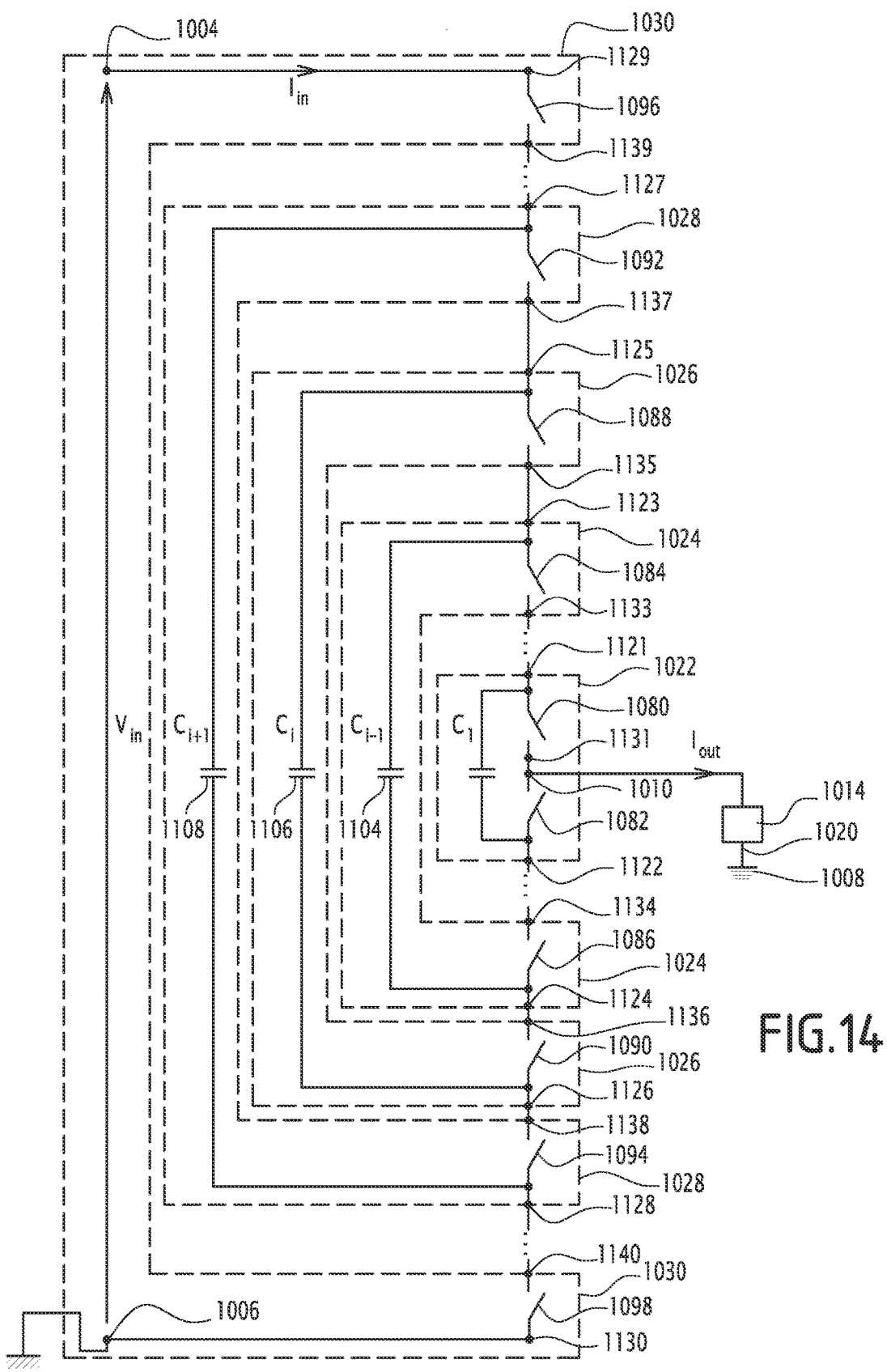
FIGS. 14 and 15 are views of the first general embodiment of a static converter with series architecture and DMC according to the invention.
Figure 15:
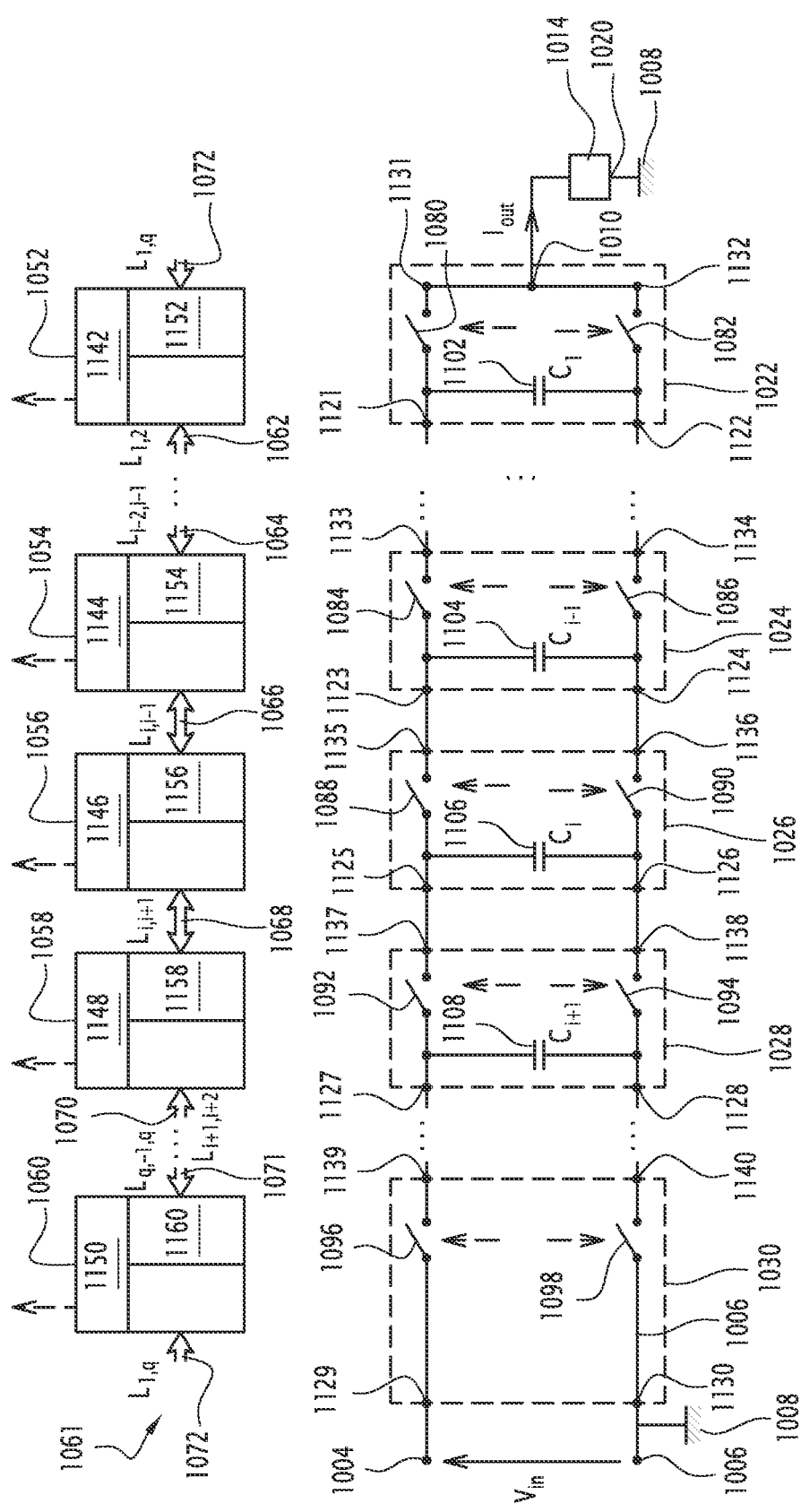

According to FIGS. 14 and 15, a static converter with series architecture 2 comprises a first power supply input terminal 1004 and a second power supply input terminal 1006, connected to a power supply source, not shown, with a voltage Vin, the second power supply input terminal 1006 being connected to a ground 1008.

The series static converter 1002 comprises an output terminal 1010 connected at a first end 1012 to an output load 1014, for example modeled by an output capacitance and an output resistance with value Rout placed in parallel, a second end 1020 of the output load 1014 being connected to the ground with reference 1008, and the output load being passed through by an output current or load denoted Iout.

The series static converter 1012 also comprises:
- a total integer number q of switching cells 1022, 1024, 1026, 1028, 1030, arranged in series,
- a same total number q of control modules 1052, 1054, 1056, 1058, 1060, shown only in FIG. 15,
- a communication chain 1061 having a same number q of communication links 1062, 1064, 1066, 1068, 1070, 1072 connecting the control modules 1052, 1054, 1056, 1058, 1060 in a daisy chain.

In general, the total number q is greater than or equal to 3.

Each electronic switching cell is respectively associated with a single and different control module, the electronic switching cell and the associated control mode being identified by a same single and different integer positioning rank i, comprised between 1 and q and larger when the switching cell is connected as close as possible to the power supply generator.

As an example, in FIGS. 14 and 15, the total number q of switching cells, and consequently of control modules, is greater than or equal to 7. Only five modules are shown, the first control module 1052 having a rank i equal to 1, the second module 1056 being a generic module having a rank with current index i, the third module 1054 having a rank with index i−1 and being an adjacent generic module preceding the generic module 1056 in the communication chain 1061, the fourth module 1058 having a rank with index i+1 and being an adjacent generic module following the generic module 1056 in the communication chain 1061, the fifth control module 1060 having a rank i equal to q and being an adjacent module preceding the generic module 1052 with rank 1 in the communication chain.

Any two control modules with ranks i and i+1 that are adjacent on the communication chain 1061 are connected by a single and different communication link, designated by $L_{i,i+1}$.

It should be noted that in the minimum structure of a converter with three control modules and three switching cells, the adjacent module following the module with rank 3 is the module with rank 1, and the adjacent module rank preceding module rank 1 is module rank 3.

It should be noted that in the case of a series architecture, the positioning rank i of course depends on the order given by the connector technology of the control modules within the loop forming the communication chain 1061, but first and foremost depends on the order set by the series connectivity of the switching cells with respect to one another relative to the load 1014 or in a complementary manner relative to the power supply source. In fact, the series connectivity order of the switching cells governs the connectivity order of the control modules within the closed communication chain 1061.

The switching cells 1022; 1024; 1026; 1028; 1030, delimited by borders in dotted lines in FIGS. 14 and 15, respectively each comprise a single and different pair of electronic switches 1080, 1082; 1084, 1086; 1088, 1090; 1092, 1094; 1096, 1098 connected in parallel through a single and different floating capacitance 1102, 1104, 1106, 1108, positioned at the input of the switching cell 1022, 1024, 1026, 1028 toward the power supply terminals 1004, 1006 when the positioning rank i is different from q.

The switching cells 1022; 1024; 1026; 1028; 1030 respectively each comprise a first pair of input terminals 1121, 1122; 1123, 1124; 1125, 1126; 1127, 1128; 1129, 1130 respectively connected at the input of two corresponding switches 1080, 1082; 1084, 1086; 1088, 1090; 1092, 1094; 1096, 1098 and the corresponding floating capacitance 1102; 1104; 1106; 1108, also denoted $C_1$, $C_{i-1}$, $C_i$, $C_{i+1}$, when it exists.

The switching cells 1022; 1024; 1026; 1028; 1030 each respectively comprise a second pair of output terminals 1131, 1132; 1133, 1134; 1135, 1136; 1137, 1138; 1139, 1140 respectively connected at the output of the two corresponding switches 1080, 1082; 1084, 1086; 1088, 1090; 1092, 1094; 1096, 1098.

The output terminals 1131, 1132 of the second pair of terminals of the switching cell 1022 with rank 1 are connected together to the sole output terminal 1010 of the converter.

The output terminals 1129 and 1130 of the first pair of the switching cell 1030 with rank q are respectively connected to the first 1004 and second 1006 power supply terminal of the converter 1002.

The input terminals of the first pair of terminals of the switching cell with any rank i comprised between 1 and q−1 and the output terminals of the second pair of terminals of the switching cell with the following rank are respectively connected to each other.

Each control module 1052, 1054, 1056, 1058, 1060 respectively comprise a simplified driving unit 1142, 1144, 1146, 1148, 1150 for the two switches of the corresponding switching cell 1022, 1024, 1026, 1028, 1030, and a single and different local unit 1152, 1154, 1156, 1158, 1160 for generating a unique triangular voltage carrier.

Each local unit for generating the triangular carrier of any control module having a current rank i is configured to control the positioning of its interleaving phase within all of the interleaved triangular carriers based only on the signals of the triangular carriers of the two modules adjacent to the any module with rank i and having respective ranks i−1, i+1, provided by the two adjacent modules i−1, i+1 to the any module with rank i through the two corresponding communication links $L_{i-1,i}$ and $L_{i,i+1}$. The rank with position i is comprised between 1 and q with i−1 equal to q when i is equal to q and i+1 equal to 1 when i is equal to q.

Thus, for example, the local unit 1152 for generating the triangular carrier of the first control module 1052 with rank 1 is configured to control the positioning of its interleaving phase within all of the interleaved triangular carriers based only on the signals of the triangular carriers of its two adjacent modules having respective ranks q, 2, provided by the two modules q, 2 adjacent to the first module 1052 through two corresponding communication links 1072, 1062, designated $L_{q,1}$ and $L_{1,2}$.

Likewise, the local unit 1160 for generating the triangular carrier of the fifth control module 1060 with rank q is configured to control the position of its interleaving phase within all of the interleaved triangular carriers based only on the signals of the triangular carriers of its two adjacent modules 1058, 1052 having respective ranks q−1, 1, provided by the same two modules q−1, 1 adjacent to the fifth module 1160 with rank q through the two corresponding communication links 1071, 1072, designated $L_{q-1,q}$ and $L_{q,1}$.

Each control module 1052, 1054, 1056, 1058, 1060 comprises a local unit for balancing the cell voltages, not shown in FIG. 15, and/or a local unit for internal regulation of the input current Iin or output current Iout of the ACP (Average Current Positioning) type, not shown in FIG. 15.

Each local unit for balancing the cell voltages of any module with rank i is configured to determine a cyclic ratio correction di based only on the difference between the mean of the values of the two cell voltages, denoted $V_{i-1}$, $V_{i+1}$ of the switching cells whose modules with rank i−1, i+1 are adjacent to the any module with rank i and the value of the cell voltage $V_i$ of the switching cell associated with the any module with rank i.

Each local unit for internal regulation of the input or output current of the ACP-type converter having a given rank i is configured through the implementation of a unique input or output current loop in order to determine a unique cyclic ratio Di, the determination of Di depending on a product of the value of the cell voltage $V_i$ of the switching cell associated with the any module and a slope factor $\alpha_i$ depending on the rank of the module.

Thus, the association in each module of the output (or input) current regulating function of the ACP-type converter, the balancing functions of the cell voltages and the function for generating carriers with management of their interleaving, makes it possible to obtain a completely decentralized control of the series converter comprising any number q of switching cells. There is then no longer any need for a centralized control member.

Figure 16:
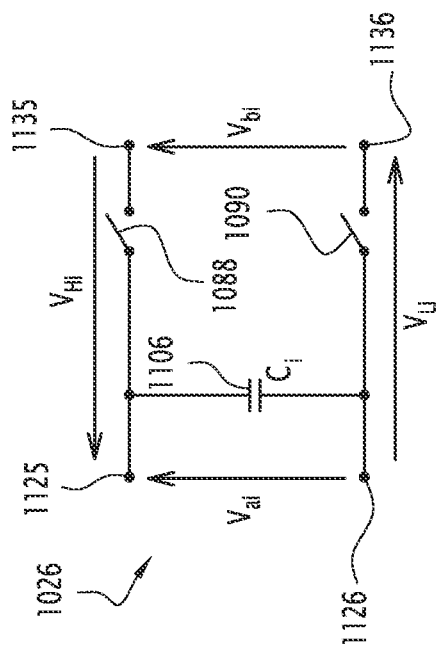
FIG. 16 is a generic view of a switching cell with rank i of the static converter with series architecture of FIGS. 14 and 15, in which the measurable parameters making it possible to obtain the cell voltage of the cell with rank i are shown.

According to FIG. 16, a switching cell having a generic rank i comprised between 2 and q−1 is for example shown by the switching cell 1026.

The cell voltage $V_i$ is equal to the sum of the voltage across the terminals of the first switch 1088 denoted VHi and the voltage across the terminals of the second switch 1090 denoted VLi.

The cell voltage $V_i$ can also be expressed by the relation:

$$V_i = V_{ai} - V_{bi} \qquad \text{(relation 7)}$$

in which $V_{ai}$ designates the differential input voltage of the cell with rank i, here across the input terminals 1125, 1126 of the first pair, and measured across the terminals of the floating capacitance Ci connected in parallel, and in which $V_{bi}$ designates the differential output voltage of the cell with rank i, here across the output terminals 1135, 1136 of the second pair, and measured across the terminals of the floating capacitance $C_{i-1}$ of the cell with the preceding rank i−1.

This relationship remains valid for i equal to 1, with $V_{a1}$ equal to the voltage measured across the terminals of floating capacitance C1 connected in parallel with the cell with rank 1 and $V_{b1}$ equal to 0 V.

This relation remains valid for i equal to q, with $V_{aq}$ equal to the input voltage Vin measured between the power supply terminals 1004, 1006 of the static converter, and $V_{bq}$ equal to the input voltage of the cell with preceding rank q−1 measured across the terminals of the floating capacitance. $C_{q-1}$.

Figure 17:
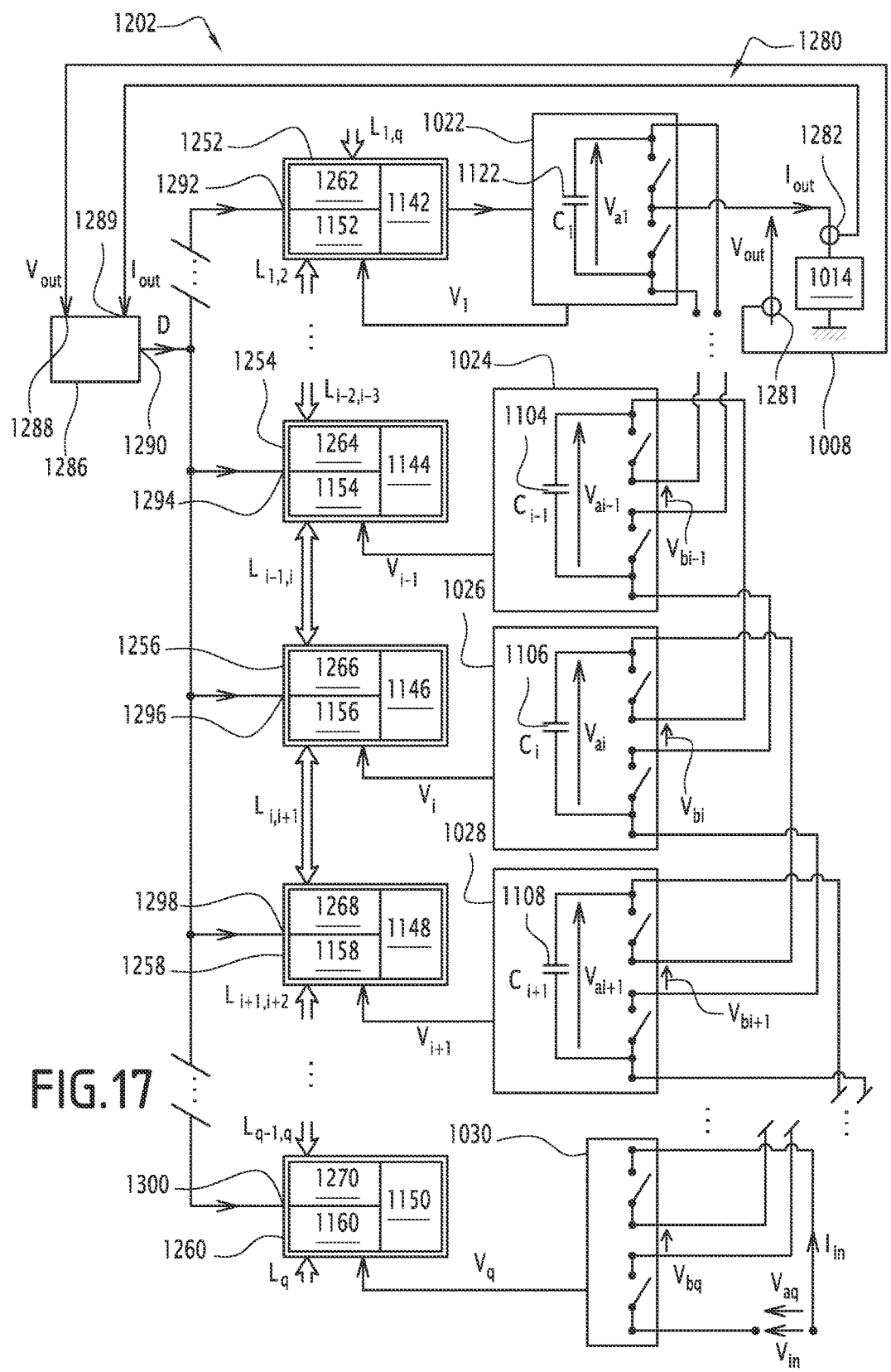
FIG. 17 is a view of a second embodiment of a static converter with series architecture and DMC according to the invention, derived from the first general embodiment described in FIGS. 14 and 15, and in which an external regulation of the voltage and the output current is implemented by an external loop and circuit, the interleaving of the commands and balancing of the cell voltages of the switching cells being implemented by local units.

According to FIG. 17, a second embodiment 1202 of the DMC of the static converter with series architecture comprises components identical to those described in FIGS. 14 and 15, bearing the same numerical references and arranged in the same architecture.

The static converter 1202 comprises control modules 1252, 1254, 1256, 1258, 1260, each respectively associated with a single and different switching cell 1022, 1024, 1026, 1028, 1040, and respectively having the same amplified driving units 1142, 1144, 1146, 1148, 1150 and the same local units 1152, 1154, 1156, 1158, 1160 for generating a unique triangular voltage carrier as those described in FIG. 15.

Each control module 1252, 1254, 1256, 1258, 1260 respectively comprises a local unit for balancing cell voltages 1262, 1264, 1266, 1268, 1270 while not having a local unit for internal current regulation of the ACP type.

Each local unit for balancing the cell voltages of a control module with any rank i, i varying from 1 to q, is configured to determine a cyclic ratio correction di based only on the difference between the mean of the values of the two cell voltages $V_{i-1}$, $V_{i+1}$ of the switching cells whose modules are adjacent to the any module with rank i and the value of the cell voltage $V_i$ of the switching cell associated with the any module of rank i.

The static converter 1202 comprises a main voltage and current loop 1280 in which the output voltage Vout and the output current Iout are observables whose images are respectively taken by a voltage tap 1281 and a current tap 1282.

The static series converter 1202 comprises an external regulating module 1286 having a first input terminal 1288, a second input terminal 1289 and an output terminal 1290.

The first input terminal 1288 and the second input terminal 1289 are respectively connected to the voltage tap 1281 and the current tap 1282 to receive a measurement signal representative of the output voltage Vout and a measurement signal representative of the output current Iout.

The external module for external regulation 1286 is configured to determine a common mode cyclic ratio D of the switching cells from the measurement of the output voltage Vout and the measurement of the output current Iout, and from a reference current Iref.

The output terminal 1290 of the external regulating module 1286 is connected in a shared manner with each local control module 1252, 1254, 1256, 1258, 1260 through an associated single and different input terminal 1292, 1294, 1296, 1298, 1300 to provide the common mode cyclic ratio D for the switching cells.

Each switching cell 1022, 1024, 1026, 1028, 1030 is configured to provide its associated module 1252, 1254, 1256, 1258, 1260 with a respective rank 1, i−1, i+1 and consequently the corresponding local unit for balancing cell voltages, with the measurement of the corresponding cell voltage $V_1$, $V_{i-1}$, $V_i$, $V_{i+1}$, $V_q$.

Each control module 1252, 1254, 1256, 1258, 1260 comprises an associated single and different adder for computing a corrected cyclic ratio $D'_1$, $D'_{i-1}$, $D'_i$, $D'_{i+1}$, $D'_q$ as the sum of the common mode cyclic ratio D and the respective cyclic ratio correction $d_1$, $d_{i-1}$, $d_i$, $d_{i+1}$, $d_q$ determined by the corresponding local unit for balancing cell voltages 1262, 1264, 1266, 1268, 1270.

Thus, associating the functions for balancing the cell voltages and generating carriers with management of their interleaving in each module makes it possible to reduce the necessary connector technology considerably between the centralized control member and the switching cells. In a case, a single wire bearing the shared common mode cyclic ratio information calculated in the external circuit is necessary. This information is transmitted in the form of voltage.

Figure 18:
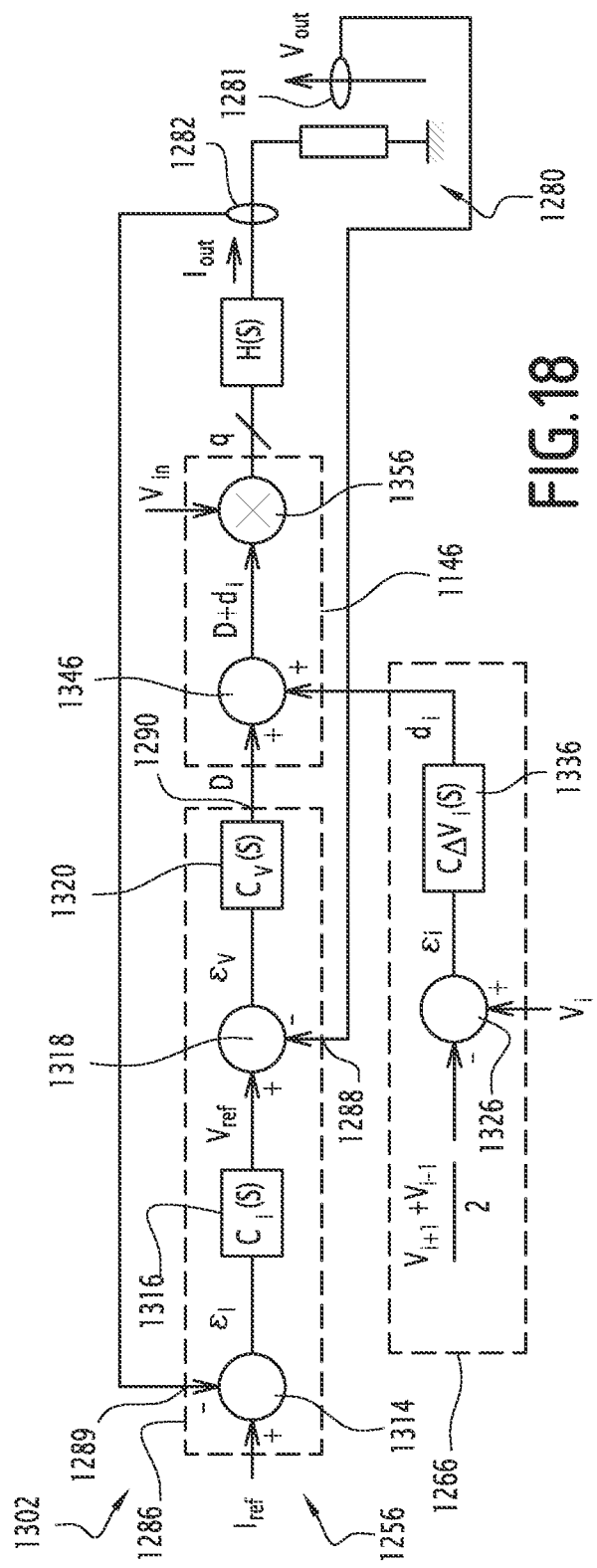
FIG. 18 shows a general diagram for implementing the balancing of cell voltages and external regulation of the voltage and output current by the external loop and module described in FIG. 17.

In FIG. 18, a simplified diagram 1302 of the DMC of the static converter 1202 of FIG. 17 shows the structural implementation of the balancing of the cell voltages and the structural implementation of the external regulation of the output voltage and current Vout, Iout by the external loop 1280 and the external module 1286, described in FIG. 17.

As a generic and representative example, the control module 1256 with rank i is partially shown with its amplified driving unit 1146 and its local unit for balancing the currents 1266.

The interaction interfaces between the amplified driving unit 1146, the local unit for balancing the currents 1266 and the external module 1286 for external output voltage and current regulation are also shown.

The external output voltage and current regulating module 1286 here is traditional in terms of the absence of an external control of the ACP type, and comprises a first subtracter 1314 with two positive and negative inputs designated by the + and − signs, a first filter 1316 for converting a common mode error current $\epsilon_I$ into a reference voltage Vref, a second subtracter 1318 with two positive and negative inputs respectively designated by the + and − signs, and a second filter 1320 for converting a common mode error voltage $\epsilon_V$ into the common mode cyclic ratio D for the switching cells.

The local unit for balancing the cell voltages 1266 is configured to determine a locally averaged cell voltage $(V_{i-1}+V_{i+1})/2$, from the data of the pair of adjacent cell voltages $V_{i-1}$, $V_{i+1}$ respectively provided by the pair of links $(L_{i-1,i}; L_{i,i+1})$.

The local unit for balancing the cell voltages 1266 respectively comprises a single and different subtracter 1326 for calculating a local differential current signal $\epsilon_i$, with, for a given i:

$$\varepsilon_i = \frac{(V_{i-1} + V_{i+1})}{2} - V_i,$$

$V_i$ being the cell voltage of the switching cell with rank i associated with the module with the same rank, $V_{i-1}$ and $V_{i+1}$ being the cell voltages of the switching cells with ranks i−1 and i+1 associated with the modules with the corresponding rank, said control modules with ranks i−1, i+1 being adjacent to the control module with rank i, in terms of positioning in the communication chain 1061.

The local unit for balancing cell voltages 1266 also comprises a single and different conversion filter 1336, characterized by its unique transfer function $C\Delta I_i(p)$, to convert the local differential current signal $\epsilon_i$ into the corresponding cyclic ratio correction $d_i$.

The local amplified driving unit 1146, associated with the control module 1146, comprises a single and different associated adder 1346, to calculate a corrected cyclic ratio $D'_i$ equal to $D+d_i$, D designating the common cyclic ratio provided by the external module for external regulation 1286 described in FIG. 17.

The adder 1346 has first and second positive input terminals, designated by a + sign, with different locations in FIG. 18. The first input terminal is connected to the external regulating unit 1286 to receive the shared cyclic ratio D, while the second input terminal is connected to the local unit for balancing the currents 1266 to receive the cyclic ratio correction $d_i$ corresponding to the control module 1256 with rank i.

When the external regulation module 1286 is working, the first subtracter 1314 calculates the difference between the predetermined reference current Iref and the output current Iout measured by the current measuring tap 1282. This difference forming the common mode error current $\epsilon_I$ is converted into a reference voltage Vref by the first conversion filter 1316 characterized by a transfer function denoted $C_I(s)$.

The reference voltage signal Vref and the output voltage signal Vout measured by the voltage tap 1281 are respectively injected in the positive input terminal and the negative input terminal of the second subtracter 1318.

The second subtracter 1318 calculates the difference (Vref−Vout) between the reference voltage signal Vref and the output voltage signal Vout, to form the common mode error voltage $\epsilon_V$. The common mode error voltage $\epsilon_V$ is converted into the common mode cyclic ratio D by the second conversion filter 1320 characterized by a transfer function denoted $C_V(s)$.

Alternatively, the external regulating unit 1286 has no internal control of the ACP type, and the external regulation done is either an external output voltage regulation based on the measurement of the output voltage, or an external output current regulation based on the output current measurement.

Alternatively, the traditional external module 1286 for external regulation is replaced by an external control module of the ACP type.

Figure 19:
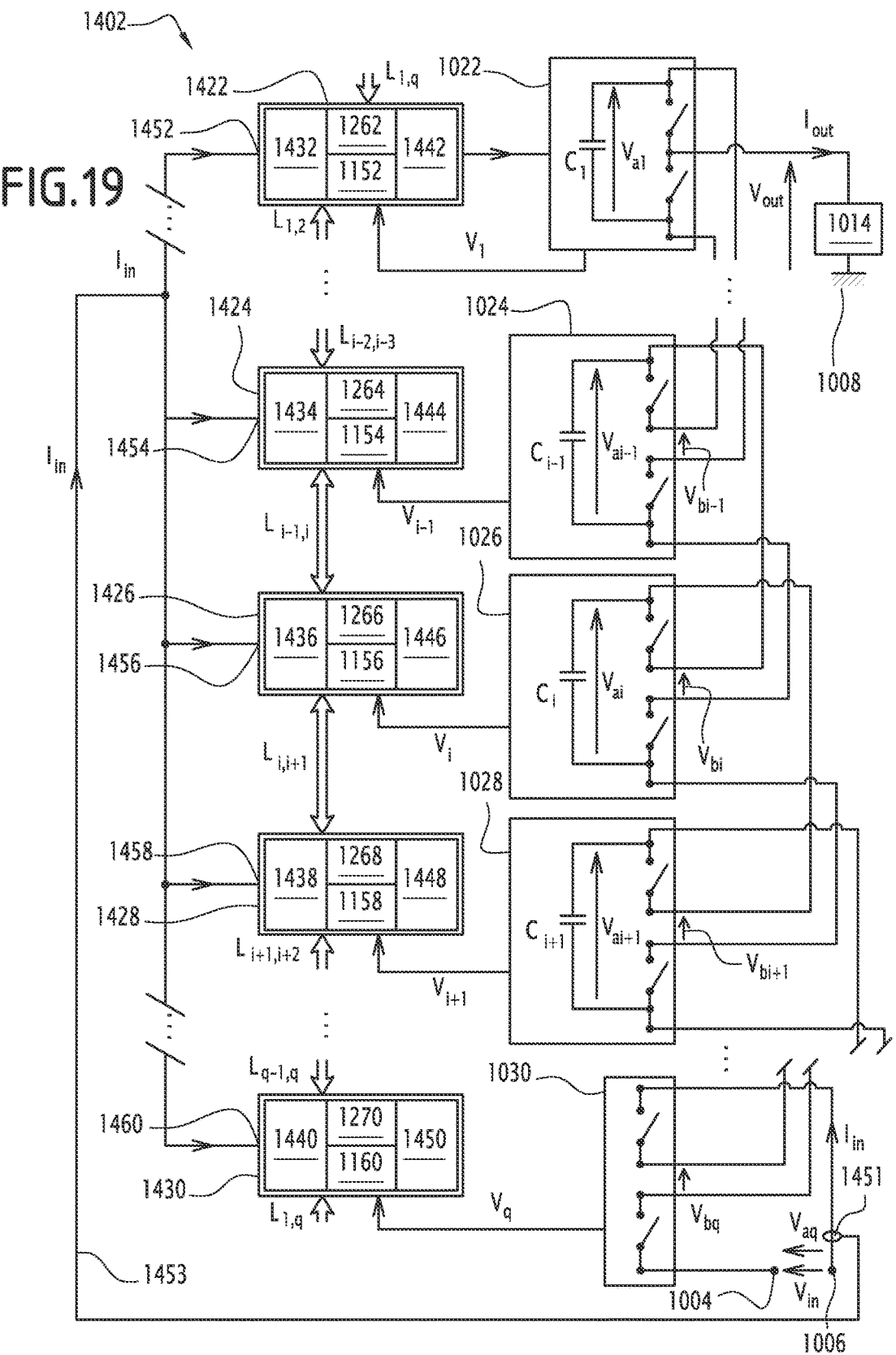
FIG. 19 is a view of a third embodiment of the static converter with series architecture and DMC, derived from the first embodiment of FIG. 15, and in which each control module has a local unit for internal regulation of the input current of the ACP (Adaptive Current Positioning) type, for managing the interleaving of the commands and a local unit for balancing the cell voltages of the switching cells.

According to FIG. 19, a third embodiment 1402 of the DMC of the static converter according to the invention, derived from the first embodiment described in FIG. 17, is shown in which the components identical to those described in FIG. 17 bear the same numerical references.

The static converter 1402 comprises control modules 1422, 1424, 1426, 1428, 1430 that respectively replace the control modules 1252, 1254, 1256, 1258, 260 [sic], respectively associated with the switching cells 1022, 1024, 1026, 1028, 1030 described in FIG. 17.

Like the static series converter 1202 of FIG. 2, each control module 1422, 1424, 1426, 1428, 1430 respectively comprises the same local unit 1152, 1154, 1156, 1158, 1160 for generating a unique triangular voltage carrier and the same local unit for balancing the currents 1262, 1264, 1266, 1268, 1270.

Unlike the static converter 1202 of FIG. 17, each control module 1422, 1424, 1426, 1428, 1430 comprises a local unit 1432, 1434, 1436, 1438, 1440 for internal regulation of the input current Iin, of the ACP type, and an amplified driving unit 1442, 1444, 1446, 1448, 1450 that differs from the amplified driving unit 1142, 1144, 1146, 1148, 1150 of FIG. 17.

Unlike the static converter 1202 of FIG. 17, the amplified driving units 1442, 1444, 1446, 1448, 1450 are the amplified driving units 1142, 1144, 146 [sic], 1148, 1150 in which the corresponding input adder has been removed.

Unlike the static converter 1202 of FIG. 17, the main loop 1280 of the common mode external regulation of the output voltage Vout and current Iout and the external module 1286 for external regulation are removed and replaced by a plurality of local regulations of the ACP type implemented internally in the control modules 1422, 1424, 1426, 1428, 1430.

The implementation of the local internal regulations, however, requires the distribution to all of the control modules of the information about the output voltage of the converter 1402 taken by an input current measuring tap 1451.

To that end, the series static converter 1402 comprises a network forming a bus 1453 for providing the measurement information of the input current Iin to each of the control modules 1422, 1424, 1426, 1428, 1430 at a respective single and different input terminal 1452, 1454, 1456, 1458, 1460.

Each internal unit for regulating the input current of the ACP type 1432, 1434, 1436, 1438, 1440 respectively comprises a single and different internal current regulating loop of the ACP type, configured to determine a unique cyclic ratio $D_1$, $D_{i-1}$, $D_i$, $D_{i+1}$, $D_q$ from the measurement of the input current Iin, the measurement of the respective cell voltage $V_1$, $V_{i-1}$, $V_i$, $V_{i+1}$, $V_q$ of the corresponding switching cell 1022, 1024, 1026, 1028, 1030, the reference current Iref, and a corrected inverse slope factor $\alpha_1$, $\alpha_{i-1}$, $\alpha_i$, $\alpha_i$ and $\alpha_q$.

Each corrected inverse slope factor $\alpha_1$, $\alpha_{i-1}$, $\alpha_i$, $\alpha_i$ and $\alpha_q$ is proportional to the product of a predetermined main reference inverse slope factor and the inverse of the respective cyclic ratio $d_1$, $d_{i-1}$, $d_i$, $d_{i+1}$, $d_q$ determined by the corresponding local unit for balancing the cell voltages 1262, 1264, 1266, 1268, 1270, according to a proportionality factor independent of the rank i of the control module.

Each cyclic ratio Di unique to the cell with rank i, i varying from 1 to q, depends on the difference between a reference voltage Vref and the product $$\frac{1}{\alpha_i} \cdot V_i$$

of the inverse of the corrected inverse slope factor $\alpha_i$ and the measured cell voltage value $V_i$ of the switching cell with rank i, the reference voltage Vref being proportional to the difference between the reference current Iref and the value of the input current Iin measured according to a constant Z/R that is substantially identical over all of the control modules.

Figure 20:
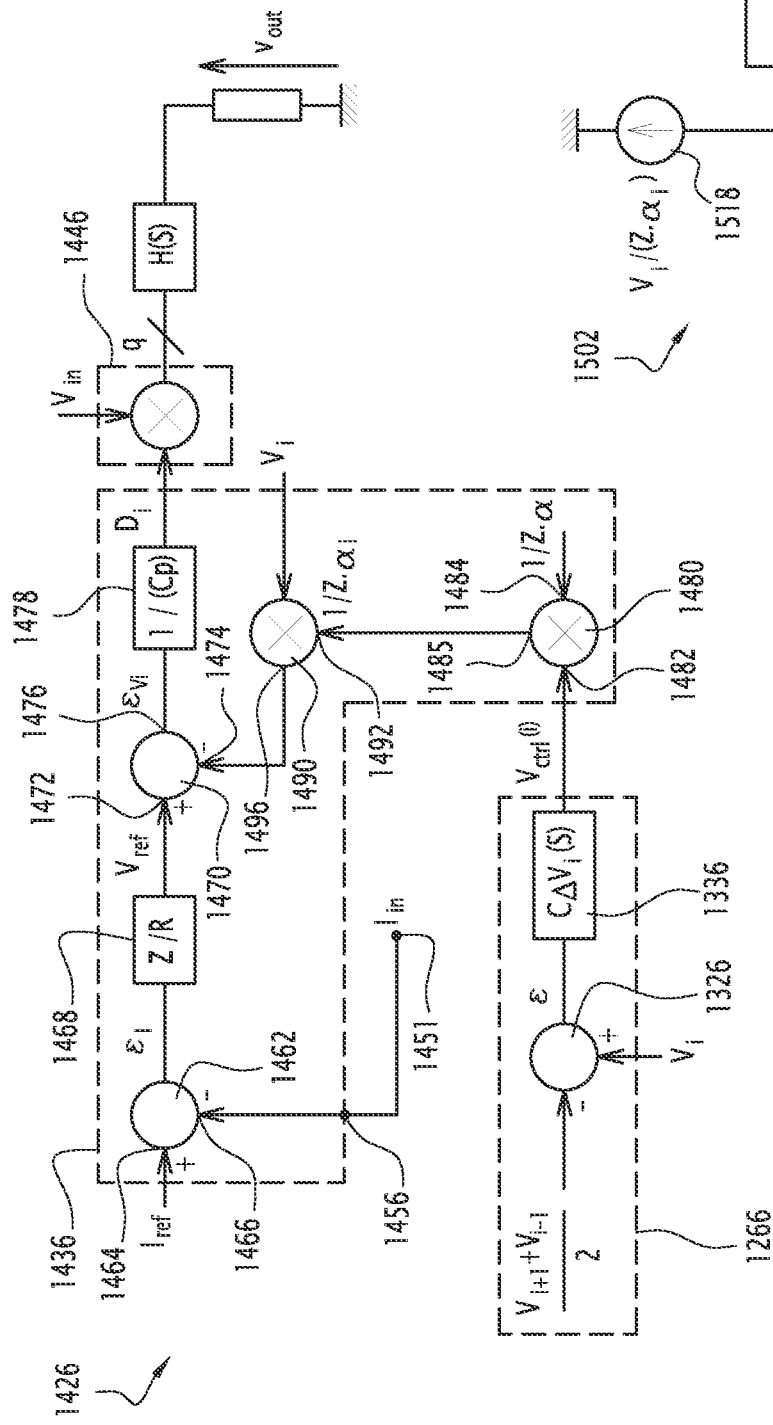
FIG. 20 is a diagram for implementing the DMC for the static converter with series architecture of FIG. 19, for local internal regulation of the input current, of the ACP type, and local balancing of the cell voltages of the switching cells.

In FIG. 20, the structural implementation of the local internal input current regulations Iin by the local units 1432, 1434, 1436, 1438, 1440 for internal regulation of FIG. 19 is described in more detail.

As an example and in order to simplify FIG. 20, only the control module 1426 with rank i is partially shown with its amplified driving unit 1446, its local unit for balancing cell voltages 1266, and its local unit 1436 for internal regulation of the input current.

The interaction interfaces between the amplified driving unit 1446, the local unit for balancing cell voltages 1266 and the local unit 1436 for internal regulation of the input current Iin are also shown.

The structure of the local unit for balancing cell voltages 1266 is identical to that described in FIG. 18.

The amplified driving unit structure 1446 is modified with respect to the structure described in FIG. 17, in which the adder 1346 has been removed.

The local unit 1436 for internal regulation of the input current comprises, connected in series, a first subtracter 1462 with two positive 1464 and negative 1466 inputs respectively marked in FIG. 20 by the + and − signs, a first proportional-type conversion filter 1468 for converting a common mode error current $\epsilon_I$ into a reference current Vref, a second subtracter circuit 1470 with two positive 1472 and negative 1474 inputs, respectively marked by the + and − signs, and an output terminal 1476, and a second filter 1478, of the integrator and conversion type, for an error voltage $\epsilon_{Vi}$ into the cyclic ratio Di unique to the control module with rank i.

The transfer function of the first proportional-type filter 1468 is written Z/R, Z and R being predetermined constants.

The transfer function of the second integrator-type filter 1478 is written 1/Cp, C being a predetermined constant and p being the Laplace operator.

The local unit 1436 for internal regulation of the input current Iin with rank i also comprises a proportional circuit 1480 for modulating the inverse of a mean inverse slope factor $\alpha$ by a correction factor Vctr(i) depending on the local unit for balancing cell voltages 1266, to create, as output, the inverse of a corrected inverse slope factor with value $\alpha_i$.

In practice, the proportional circuit 1480 is a constant gain amplifier 1/Z$\alpha$ whereof the input is connected to the output of the local unit for balancing cell voltages 1266.

In FIG. 20, the proportional circuit 1480 is depicted by a first multiplier 1480 having a first input terminal 1482 connected to the local unit for balancing the cell voltages 1266, a second input terminal 1484 for receiving the fixed mean inverse slope factor $\alpha$, and a third output terminal 1485.

The unit 1436 for internal regulation of the input current Iin also comprises a second multiplier 1490 having a first input terminal 1492, connected to the output terminal 1485 of the proportional circuit 1480, a second input terminal 1492 connected to a measuring tap for the cell voltage $V_i$ of the switching cell with rank i, and an output terminal 1496 connected to the negative terminal 1474 of the second subtracter 1'70.

When the local unit 1436 for internal regulation is working, the first subtracter 1'62 calculates the difference between the predetermined reference current Iref and the input current Iin measured by the input current measuring tap 1451. This difference forming the common mode error current $\epsilon_I$ is converted into a reference voltage Vref by the first conversion filter 1468, characterized by its transfer function Z/R.

The local unit for balancing the current 1266 with rank i delivers a slope correction signal Vctr(i) that is next multiplied by the inverse of the mean inverse slope factor α to create, as output of the first multiplier 1480, the inverse of a corrected inverse slope factor with value $α_i$ multiplied by the constant 1/Z.

The second multiplier 1490 that receives, to within the proportionality constant 1/Z, the inverse of the corrected inverse slope factor $α_i$ and the value of the cell voltage $V_i$ of the switching cell with rank i calculates the product $$\frac{1}{Z}\frac{1}{α_i} \cdot V_i,$$

that product then being provided to the second subtracter 1470.

Figure 21:
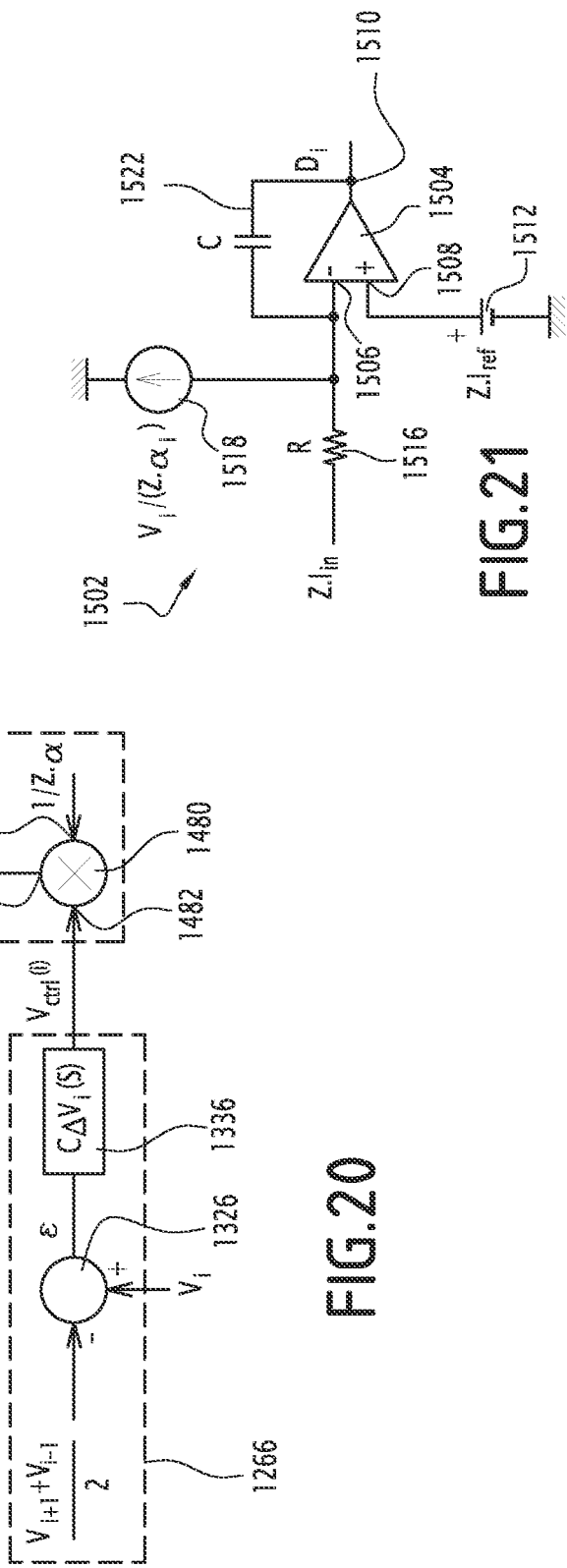
FIG. 21 is a view of the embodiment of the internal local regulation of the input current, of the ACP type and described in FIG. 20, using an operational amplifier.

In FIG. 21, the local unit 1436 for internal regulation of the input current Iin of the ACP type is for example made by an electronic circuit 1502, the core of which is an operational amplifier 1504.

The operational amplifier 1504 comprises a first input voltage negative terminal 1506, a second input voltage positive terminal 1508, and an output terminal 1510.

The electronic circuit 1502 comprises a regulated reference voltage Vref source 1512, connected to the second positive terminal 1508, and an input resistance with value R having a first end connected to the first negative terminal 1506 and a second end connected to the measuring tap for the input current through an impedance current/voltage converter Z to receive the measuring signal of the input current converted into voltage.

The electronic circuit 1502 also comprises a capacitance with value C, connected in feedback between the output terminal 1510 and the first negative terminal 1506 of the operational amplifier 1504, and a voltage generator $$\frac{1}{Z}\frac{1}{α_i} \cdot V_i$$

linearly modulated by the cell voltage $V_i$ of the switching cell with rank i. The corrected inverse slope factor $α_i$ depends on a mean inverse slope factor α shared by all of the modules and a slope correction factor Vctr(i) unique to the module with rank i. The slope correction factor Vctr(i) depends on the local balancing of the cell voltage $V_i$ of the switching cell with rank i with its two adjacent cell voltages $V_{i-1}, V_{i+1}$ of the corresponding switching cells with rank i−1 and i+1.

In static operating conditions, the input current Iin verifies the relation:

$$I_{in} = I_{ref} + \frac{R \cdot V_i}{Z^2 \cdot α_i} \quad \text{(relation 8)}$$

In dynamic operating conditions, the voltage $V_{Di}$, representative of the cyclic ratio $D_i$, verifies the relation:

$$V_{Di}(p) = -\frac{1}{C \cdot p} \cdot \frac{Z \cdot Iin(p)}{R} - \frac{1}{C \cdot p} \cdot \frac{1}{Z \cdot α_i} \cdot V_i(p), \quad \text{(relation 9)}$$

in which p designates the Laplace operator.

Figure 22:
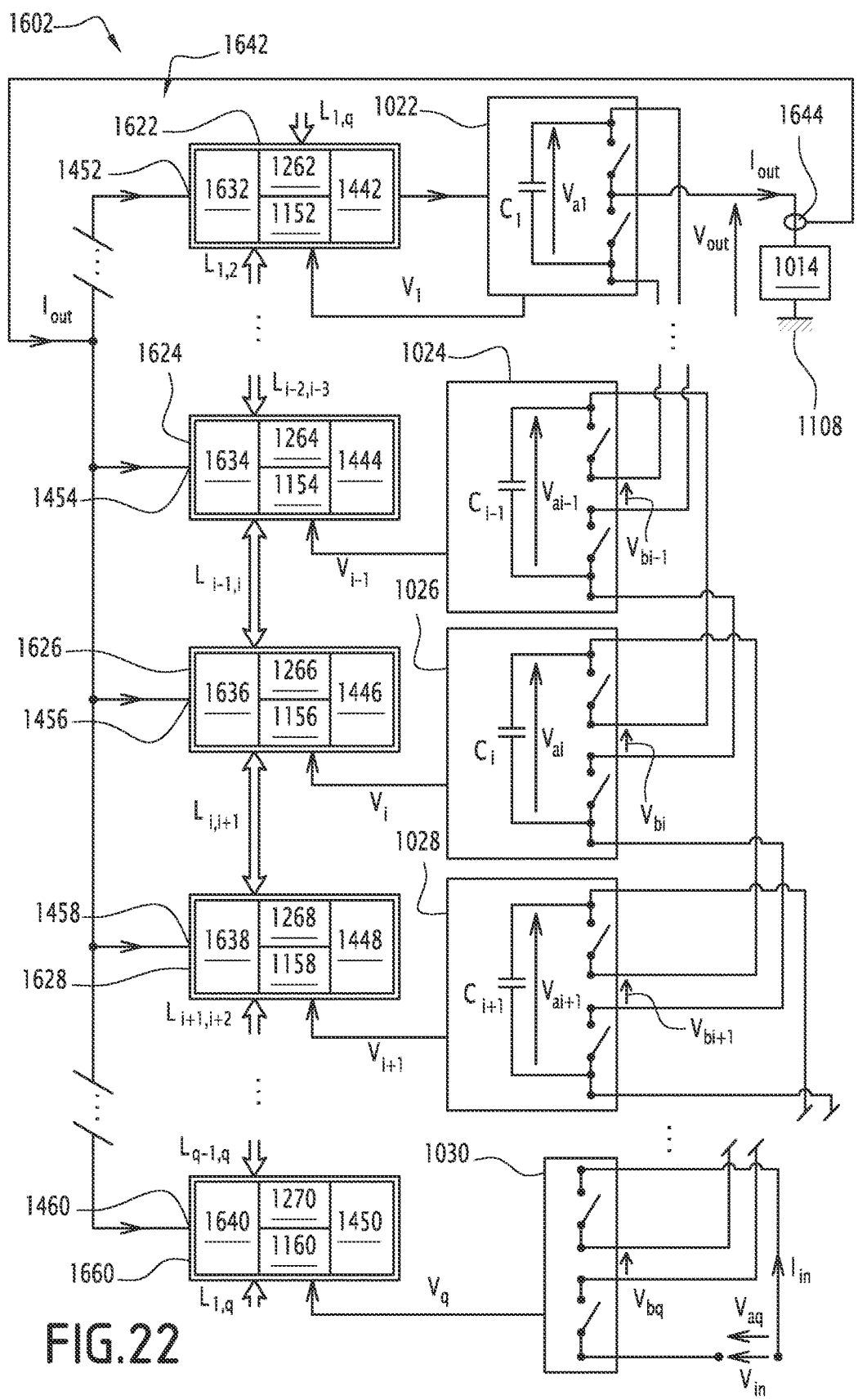
FIG. 22 is a view of a fourth embodiment of the static converter with series architecture and DMC, derived from the third embodiment of FIG. 19, and in which each control module has a local unit for internal regulation of the output current of the ACP type, for managing the interleaving of the commands and a local unit for balancing the cell voltages of the switching cells.

In FIG. 22, a fourth embodiment 1602 of the DMC of the static converter according to the invention, derived from the third embodiment 1402 described in FIG. 19, comprises components which, when they are identical to those described in FIG. 19, bear the same numerical references.

Like the series static converter 1402 of FIG. 19, each control module 1622, 1624, 1626, 1628, 1630 respectively comprises the same local unit 1152, 1154, 1156, 1158, 1160 for generating a unique triangular voltage carrier, the same local unit for balancing the cell voltages 1262, 1264, 1266, 1268, 1270, and the same amplified driving unit 1442, 1444, 1446, 1448, 1450.

Unlike the static converter 1402 of FIG. 19, the internal local regulations of the ACP type are local regulations of the output current Iout of the converter instead of the input current Iin of the converter.

The static converter 1602 comprises control modules 1622, 1624, 1626, 1628, 1630 that respectively replace the control modules 1422, 1424, 1456, 1428, 1430, respectively associated with the switching cells 1022, 1024, 1026, 1028, 1030 and described in FIG. 19. The control modules 1622, 1624, 1626, 1628, 1630 have the same components and the same architecture as the control modules 1422, 1424, 1456, 1428, 1430, and differ therefrom only by the adjustment values of the constants C, R, Z.

Unlike the static converter 1402 of FIG. 19, the shared end of the distribution network 1453 to all of the control modules of the current observable that one wishes to regulate is connected to a measuring tap 1644 for the output current Iout.

Figure 23:
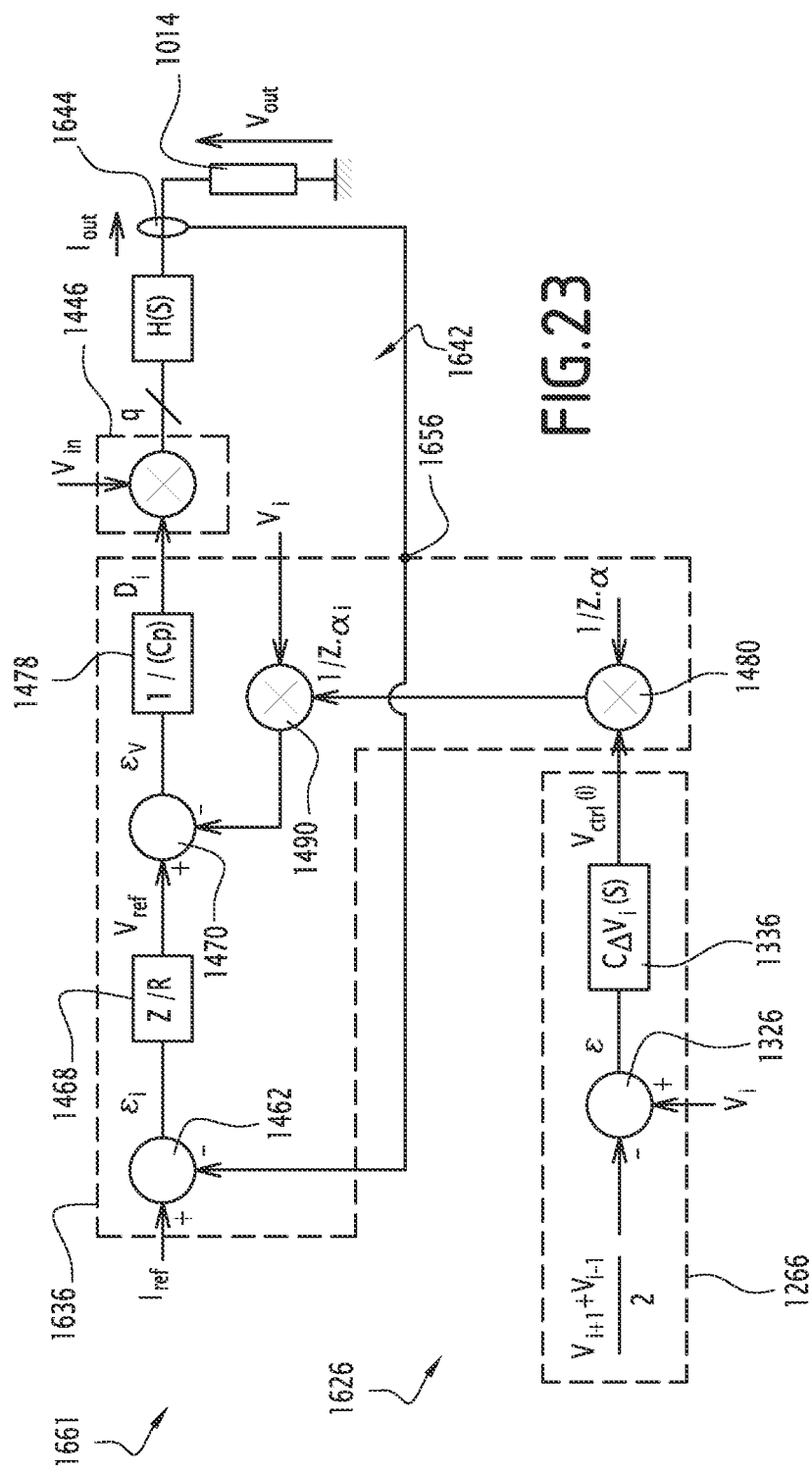
FIG. 23 is a diagram of the implementation, by the static converter with series architecture of FIG. 22, of internal local regulation of the output current, of the ACP type and for local balancing of the cell voltages of the switching cells.

According to FIG. 23, the structural implementation of local internal regulations of the output current by the local units 1632, 1634, 1636, 1638, 1640 for internal regulation of the output current of the ACP type is identical to that described in FIG. 20, with the exception of the input terminal of each first subtracter, which is connected to the tap 1644 for shared measurement of the output current Iout.

It should be noted that for this regulation operating scheme, in static operating conditions, the output current Iout verifies the relation:

$$I_{out} = I_{ref} + \frac{R \cdot V_i}{Z^2 \cdot α_i} * \text{sign}(I_{ref}), \quad \text{(relation 10)}$$

in which the sign (•) designates the sign function.

In dynamic operating conditions, the voltage $V_{Di}$, representative of the cyclic ratio $D_i$, verifies the relation:

$$V_{Di}(p) = -\frac{1}{C \cdot p} \cdot \frac{Z \cdot Iout(p)}{R} - \frac{1}{C \cdot p} \cdot \frac{1}{Z \cdot α_i} \cdot V_i(p) \quad \text{(relation 11)}$$

Figure 24:
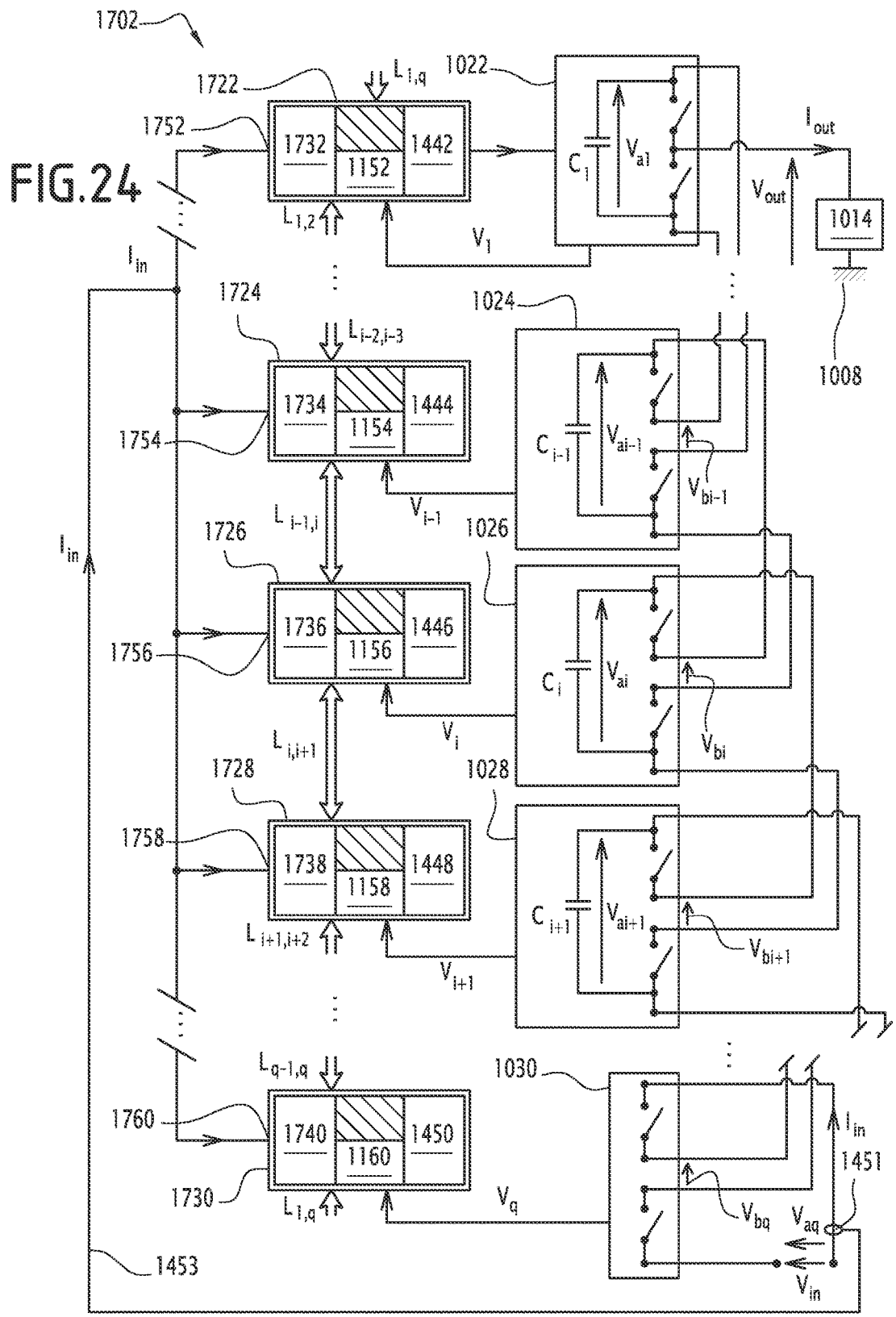
FIG. 24 is a view of a fifth embodiment of the static converter with series architecture, derived from the third embodiment of FIG. 19, and in which each control module has a local unit for internal regulation of the input current of the ACP type, a device for managing the interleaving of the commands while not having a local unit for balancing the cell voltages of the switching cells.

In FIG. 24, a fifth embodiment 1702 of the DMC of the series static converter according to the invention, derived from the third embodiment described in FIG. 19, comprises components which, when they are identical to those described in FIG. 19, bear the same numerical references.

The static converter 1702 comprises control modules 1722, 1724, 1726, 1728, 1730 that respectively replace the control modules 1422, 1424, 1426, 1428, 1430, respectively associated with the switching cells 1022, 1024, 1026, 1028, 1030 and described in FIG. 19.

Like the static converter 1402 of FIG. 19, each control module 1722, 1724, 1726, 1728, 1730 respectively comprises the same local unit 1152, 1154, 1156, 1158, 1160 for generating a unique triangular voltage carrier, and the same amplified driving unit 1442, 1444, 1446, 1448, 1450.

Like the static converter 1402 of FIG. 19, the implementation of the local internal regulations of the ACP type requires the distribution to all of the control modules, by the bus 1453, of the information related to the input current Iin of the series converter taken by the input current measuring tap 1451.

Unlike the static converter 1402 of FIG. 19, each control module 1722, 1724, 1726, 1728, 1730 has no local unit for balancing the cell voltages and comprises a local unit 1732, 1734, 1736, 1738, 1740 for internal regulation of the input current Iin, of the ACP type.

Each internal regulation unit for the input voltage of the ACP type 1732, 1734, 1736, 1738, 1740 respectively comprises a single and different internal loop for regulating input current of the ACP type, configured to determine a unique cyclic ratio $D_1, D_{i-1}, D_i, D_{i+1}, D_q$ from the measurement of the input current Iin, the measurement of the cell voltage $V_1$, $V_{i-1}, V_i, V_{i+1}, V_q$ of the corresponding switching cell 1022, 1024, 1026, 1028, the reference current Iref, and a corrected unique inverse slope factor $\alpha_1, \alpha_{i-1}, \alpha_i, \alpha_i$ and $\alpha_q$, adjusted to be substantially equal to a same mean inverse slope factor $\alpha$, predetermined and shared by all of the control modules 1722, 1724, 1726, 1728, 1730.

Each unique cyclic ratio Di associated with a control module, i varying from 1 to q, depends on the difference between a reference voltage Vref and the product $$\frac{1}{\alpha_i} \cdot V_i$$

of the inverse of the unique inverse slope factor $\alpha_i$ substantially equal to $\alpha$ and the measured value of the cell voltage $V_i$ with rank i, the reference voltage Vref being proportional to the difference between the reference current Iref and the input current Iin measured according to a proportionality constant Z/R substantially identical relative to the set of control modules.

Thus and by nature, the current regulation of the ACP type at each cell offers natural balancing of the cell voltages. It is, however, possible for slight disparities between the values of the components of the electronics of each module to cause slight deviations on the cell voltages. If these deviations are tolerable (which is generally the case), the association in each module of the output (or input) current regulating function of the ACP-type converter, the balancing functions of the cell voltages and the function for generating carriers with management of their interleaving, makes it possible to obtain a completely decentralized control of the series converter comprising any number q of switching cells. There is then no longer any need for a centralized control member.

Figure 25:
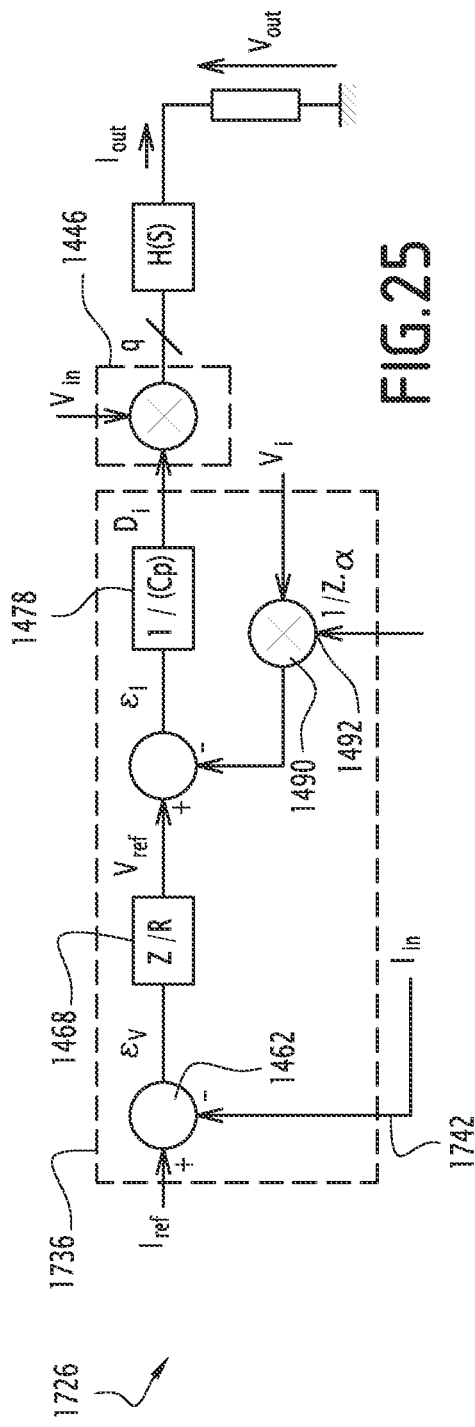
FIG. 25 is a diagram of the implementation, by the static converter with series architecture of FIG. 24, of the local internal regulation of the input current of the ACP type while not having the local units for balancing the cell voltages of the switching cells.

In FIG. 25, the structural implementation of the local internal regulations of the input current Iin by the local units 1732, 1734, 1736, 1738, 1740 for internal regulation of the input current, of the ACP type, is described in more detail.

As an example, and in order to simplify FIG. 25, only the control module 1726 with rank i is partially shown with its amplified driving unit 1446, and its local units 1736 for internal regulation of the input current.

The interaction interfaces between the amplified driving unit 1446 and the local units 1736 for regulation of the input current Iin are also shown.

The local unit 1736 for internal regulation of the input current of the ACP type is identical to the local unit for internal regulation of the input current in input current of the ACP type 1436 of FIG. 20, in which the proportional circuit or the first multiplier 1480, then connected to a local unit for balancing the currents, has been removed.

The multiplier 1490 becomes the single multiplier in which the first input terminal 1492 receives the unique setpoint of the inverse of the corrected inverse slope factor $\alpha_i$ to within the proportionality constant, with $\alpha_i$ substantially equal to $\alpha$, i.e., receives $$\frac{1}{Z \cdot \alpha}.$$

The second input terminal 1494 remains connected to the terminal supplying the cell voltage $V_i$ by the switching cell with rank i.

The local unit 1736 for internal regulation of the output voltage is for example made by an electronic circuit with the same structure as that 1502 described in FIG. 21.

Unlike the circuit 1502 of FIG. 21, the voltage generator $$\frac{1}{Z} \frac{1}{\alpha_i} \cdot V_i$$

linearly modulated by the cell voltage $V_i$ of the switching cell with rank i is replaced by a voltage generator with value $$\frac{1}{Z} \frac{1}{\alpha} \cdot V_i,$$

linearly modulated by the cell voltage $V_i$ according to a linear coefficient $$\frac{1}{Z \cdot \alpha}$$

independent from the rank i of the control module.

In static operating conditions, the input current Iin verifies the relation:

$$I_{in} = I_{ref} + \frac{R \cdot V_i}{Z^2 \cdot \alpha} \quad \text{(relation 12)}$$

In dynamic operating conditions, the voltage $V_{Di}$, representative of the cyclic ratio $D_i$, verifies the relation:

$$V_{Di}(p) = -\frac{1}{C \cdot p} \cdot \frac{Z \cdot Iin(p)}{R} - \frac{1}{C \cdot p} \cdot \frac{1}{Z \cdot \alpha} \cdot V_i(p). \quad \text{(relation 13)}$$

Figure 26:
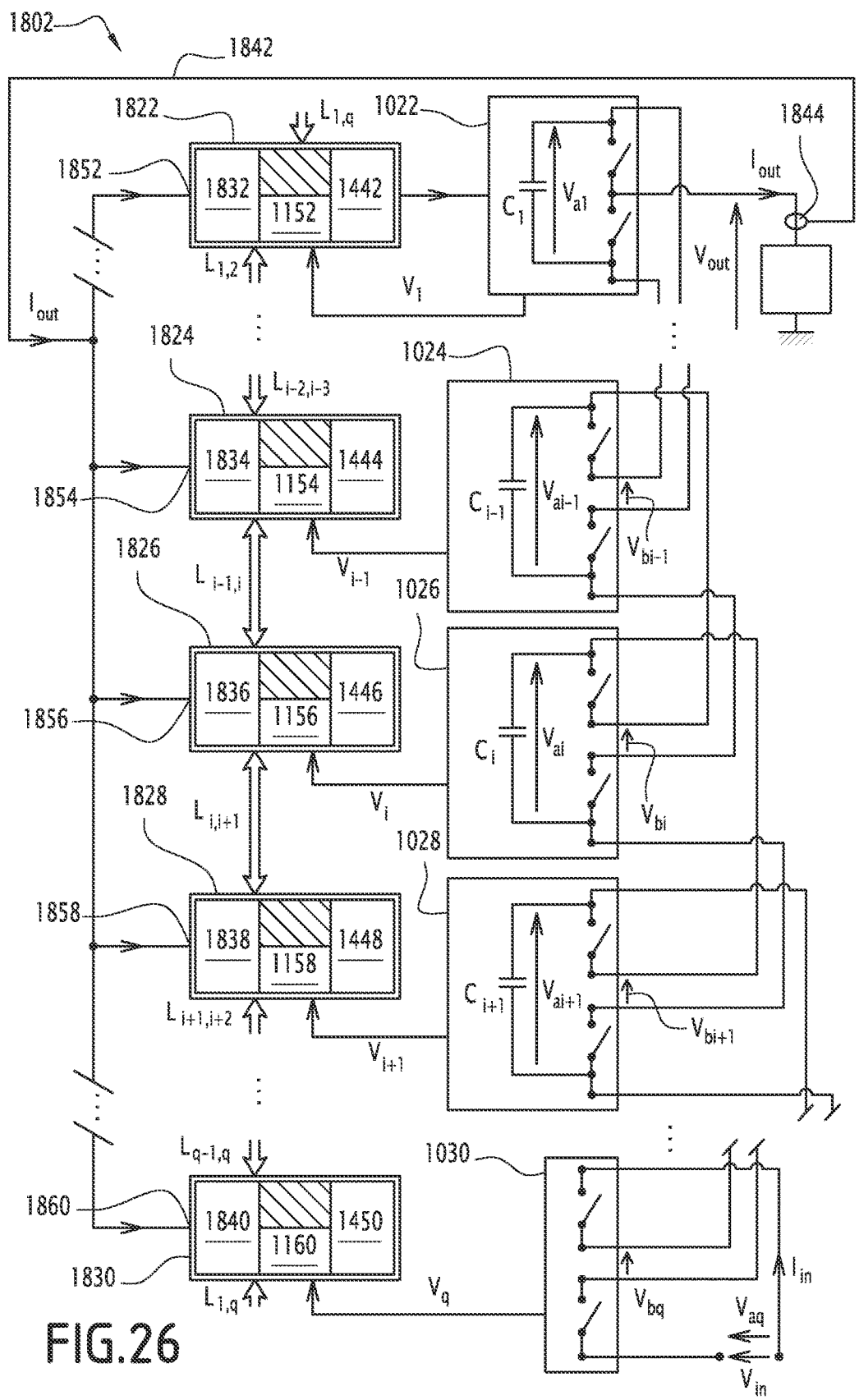
FIG. 26 shows a sixth embodiment of the static converter with series architecture and DMC, derived from the fourth embodiment of FIG. 22, and in which each control module has a local unit for internal regulation of the output current of the ACP type and a device for managing the interleaving of the commands, and does not have a local unit for balancing the cell voltages of the switching cells.

According to FIG. 26, a sixth embodiment 1802 of the DMC of the static converter with series architecture according to the invention, derived from the fourth embodiment described in FIG. 22, comprises shared components, which bear the same numerical references when they are identical to those described in FIG. 22.

The static converter 1802 comprises control modules 1822, 1824, 1826, 1828, 1830 that respectively replace the control modules 1622, 1624, 1626, 1628, 1630, respectively associated with the switching cells 1022, 1024, 1026, 1028, 1030 and described in FIG. 22.

Like the static converter 1602 of FIG. 22, each control module 1822, 1824, 1826, 1828, 1830 respectively comprises the same local unit 1152, 1154, 1156, 1158, 1160 for generating a unique triangular voltage carrier, and the same amplified driving unit 1442, 1444, 1446, 1448, 1450.

Like the static converter 1602 of FIG. 22, the implementation of the local internal regulations of the ACP type requires the distribution to all of the control modules, by the bus 1453, of the information related to the output current of the series converter taken by the input current measuring tap 1644.

Unlike the static converter 1602 of FIG. 22, each control module 1822, 1824, 1826, 1828, 1830 has no local unit for balancing the cell voltages and comprises a local unit 1832, 1834, 1836, 1838, 1840 for internal regulation of the output current Iout, of the ACP type.

Each internal unit for regulation of the output current of the ACP type 1832, 1834, 1836, 1838, 1840 respectively comprises a single and different internal loop for regulation of the output current of the ACP type, configured to determine a unique cyclic ratio $D_1, D_{i-1}, D_i, D_{i+1}, D_q$ from the measurement of the output current Iout, the measurement of the cell voltage $V_1, V_{i-1}, V_i, V_{i+1}, V_q$ of the corresponding switching cell 1022, 1024, 1026, 1028, the reference current Iref, and a unique corrected inverse slope factor $\alpha_1, \alpha_{i-1}, \alpha_i, \alpha_i$ and $\alpha_q$, adjusted to be substantially equal to a same mean inverse slope factor $\alpha$, predetermined and shared by all of the modules.

Each unique cyclic ratio Di associated with a control module, i varying from 1 to q, depends on the difference between a reference voltage Vref and the product $$\frac{1}{\alpha_i} \cdot V_i$$

of the inverse of the unique inverse slope factor $\alpha_i$ substantially equal to $\alpha$ and the measured value of the cell voltage $V_i$ with rank i, the reference voltage Vref being proportional to the difference between the reference current Iref and the value of the output current measured according to a proportionality constant Z/R that is substantially identical relative to all of the control modules.

Figure 27:
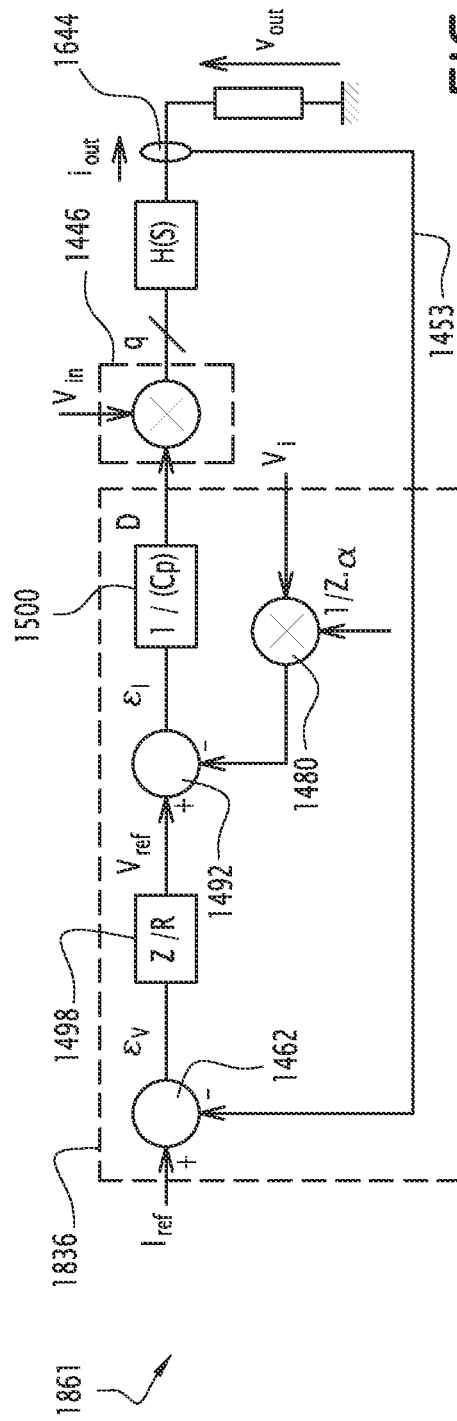
FIG. 27 shows a diagram of the implementation of the DMC, by the static converter with series architecture of FIG. 26, of the local internal regulation of the output current of the ACP type while not having local balancing units for the cell voltages of the switching cells.

According to FIG. 27, the structural implementation of local internal regulations of the output current by the local units 1832, 1834, 1836, 1838, 1840 for internal regulation of the output current of the ACP type is identical to that described in FIG. 25, with the exception of the input terminal of each first subtracter, for example the circuit 1462, which is connected to the tap for shared measurement of the output current 1644, as described in FIG. 26.

It should be noted that for this regulation operating scheme, in static operating conditions, the output current Iout verifies the relation:

$$I_{out} = I_{ref} + \frac{R \cdot V_i}{Z^2 \cdot \alpha} * \text{sign}(I_{ref}) \quad \text{(relation 14)}$$

In dynamic operating conditions, the voltage $V_{Di}$, representative of the cyclic ratio $D_i$, verifies the relation:

$$V_{Di}(p) = -\frac{1}{C \cdot p} \cdot \frac{Z \cdot I_{out}(p)}{R} - \frac{1}{C \cdot p} \cdot \frac{1}{Z \cdot \alpha} \cdot V_i(p) \quad \text{(relation 15)}$$

For all of the various configurations of static converters with parallel or series architecture, the switches of the switching cells are traditional electronic switches.

For example, the electronic switches are comprised in the set made up of bipolar transistors, power MOS transistors, IGBT transistors, GTO thyristors, etc.

In addition to the traditional silicon technologies, technologies of the gallium nitride GaN and silicon carbide SiC type may be used to produce the switches for the static converters described above.

As an alternative for each of the embodiments of the static converters described above, each amplified driving unit, except its adder when one exists, is not part of the associated module, but is positioned near the associated switching cell.

The invention claimed is:

1. A static converter with parallel architecture, designed to be powered by a voltage source Vin and to provide an output current Iout, comprising a first power supply input terminal, a second power supply input terminal, an output terminal, a total number q of electronic switching cells arranged in parallel, a total number q of output branches connected in common along first ends to the output terminal, a same total number q of control modules, a chain of q communication links connecting the control modules in a closed loop, each electronic switching cell being associated with a single and different control module and with a single and different output branch, the associated module, switching cell and output branch being identified by a same single and different integer rank, comprised between 1 and q, for positioning i within the communication chain, any two control modules, adjacent within the communication chain and with respective rank i, i+1, being connected by a single and different communication link $L_{i,i+1}$, the switching cells each comprising a single and different pair of two electronic switches connected in series, a first cell power supply terminal, a second cell power terminal supply and a single and different intermediate output terminal, shared by the two electronic switches connected in series and connected to a second end of the associated output branch, the first cell power supply terminals and the second cell power supply terminals being connected to the first power supply input terminal and the second power supply input terminal, respectively, each control module respectively comprising a single and different local unit for generating a unique triangular voltage carrier, the local unit for generating the triangular carrier of any control module with rank i being configured to control the positioning of its interleaving phase within all of the interleaved triangular carriers based solely on the signals of the triangular carriers of the two modules with respective rank i−1, i+1 adjacent to the any module with rank i, provided by the two modules adjacent to the any module through two corresponding communication links, i being comprised between 1 and q, with i−1 equal to q when i is equal to 1, and i+1 equal to 1 when i is equal to q, wherein each control module respectively comprises a single and different local unit for balancing the currents, and/or a single and different unit for internal regulation of the output voltage of the AVP type the local unit for balancing the currents of any module with rank i being configured to determine a cyclic ratio correction di based solely on the difference between the mean of the values of the two currents $I_{i−1}$, $I_{i+i}$ passing through the two output branches of the switching cells whose modules are adjacent to the any module with rank i and the value of the current Ii passing through the branch connected to the switching cell associated with the any module of rank i, the internal unit regulating the output voltage of the AVP type of any module with rank i being configured by implementing a unique internal voltage and/or current loop to determine a unique cyclic ratio Di, the determination of Di depending on a product of the value of the current Ii passing through the branch connected to the switching cell associated with the any module with rank i and a slope factor αi depending on the rank i of the module.

2. The static converter with parallel architecture according to claim 1, wherein each control module comprises a local unit for balancing the currents and an internal unit for regulating the output voltage of the AVP type, or comprises a local unit for balancing the currents while having no internal unit for regulating the output voltage of the AVP type, and wherein for each branch associated with any module i, an individual measurement of the current Ii passing through the branch is provided when the any module comprises a local unit for balancing the currents and an internal unit for regulating the output voltage of the AVP type, and wherein for each branch associated with any module i, either an individual measurement of the current Ii passing through the branch is provided, or two differential measurements between the current passing through the branch associated with the any module and the currents passing through the two branches respectively associated with the modules adjacent to the any module are provided, when the any module comprises a local unit for balancing currents and does not have an internal unit for regulating the output voltage of the AVP type.

3. The static converter with parallel architecture according to claim 2, wherein each control module comprises a local unit for balancing currents and does not have an internal unit for regulating the output voltage of the AVP type, and wherein a main voltage and/or current regulating loop, outside the modules, is configured by an outside regulating module to determine a common mode cyclic ratio D with the branches from a measurement of the output voltage Vout and/or a measurement of the output current Iout, and from a reference voltage Vref and/or a reference current Iref, and each module with rank i comprises a receiving terminal connected to the external regulating unit to receive the common mode cyclic ratio D, and a single and different adder to calculate a corrected cyclic ratio D'i as the sum of the cyclic ratio D of the common mode and the cyclic ratio correction di determined by the local unit for balancing the currents of the module i.

4. The static converter with parallel architecture according to claim 3, wherein a main voltage and current regulating loop, outside the modules and of the AVP type, is configured by an external regulating unit to determine a common mode cyclic ratio D with branches from the measuring tap for the output voltage Vout, the measuring tap for the output current Iout, the reference voltage Vref and a main slope factor α for dummy current source, and each module with rank i comprises a receiving terminal connected to the external regulating unit to receive the common mode AVP cyclic ratio D, and a single and different adder circuit to calculate a corrected cyclic ratio D'i as the sum of the common mode AVP cyclic ratio D and the cyclic ratio correction di determined by the local unit for balancing the currents of the module i.

5. The static converter with parallel architecture according to claim 2, wherein each control module comprises a local unit for balancing currents and an internal unit for regulating the output voltage of the AVP type, and each internal unit for regulating the output voltage of the AVP type comprises an internal loop for regulating the voltage of the AVP type, configured to determine a unique common mode cyclic ratio Di from a measurement of the output voltage Vout, a measurement of the output current Ii passing through the associated branch, a reference voltage Vref, and a corrected slope factor αi, the corrected slope factor αi is proportional to the product of a mean main slope factor α shared by all of the modules and the corrective factor $V_{ctrl}$ (i) determined by the local unit for balancing the currents of the module i according to a proportionality ratio independent of the rank i of the module, the unique common mode cyclic ratio Di depends on the difference between a reference current Iref and the product of the slope correction factor αi and the value of the measured branch current Ii, the reference current Irf being proportional to the difference between the reference voltage Vref and the value of the output voltage Vout measured according to a constant 1/R that is substantially identical over all of the modules.

6. The static converter with parallel architecture according to claim 1, wherein each control module comprises an internal unit for regulating the output voltage of the AVP type and does not have a local unit for balancing currents, and each internal unit for regulating the output voltage of the AVP type comprises an internal voltage regulating loop of the AVP type, configured to determine a unique common mode cyclic ratio Di from an output voltage measurement Vout, an output current measurement Ii passing through the associated branch, a reference voltage Vref, and a unique current source slope factor αi, the unique slope factor αi is adjusted to be substantially equal to a main slope factor value α shared by all of the modules, the unique common mode cyclic ratio Di depends on the difference between a reference current Iref and the product of the unique slope factor αi and the value of the measured branch current Ii, the reference current Irf being proportional to the difference between the reference voltage Vref and the value of the output voltage Vout measured according to a constant 1/R that is substantially identical over all of the modules.

7. The static converter with parallel architecture according to claim 1, wherein each module with any rank i, the modules adjacent to that module with rank i−1, i+1, and the corresponding communication links $L_{i-1,i}$, $L_{i,i+1}$ are configured to exchange relevant information related to the module of any rank i taken from among the current $I_i$ of the branch with rank i, the currents $I_{i+1}$, $I_{i-1}$ of the adjacent branches with rank i−1, i+1, the differential currents $I_i-I_{i-1}$ and $I_{i+1}-I_i$, the triangular carrier signals of the module of any rank i and the modules adjacent to that module with rank i−1, i+1.

8. The static converter with parallel architecture according to claim 1, wherein each branch comprises one or more smoothing inductors, the smoothing inductors of two branches of any two adjacent modules being able to be coupled.

9. The static converter with parallel architecture according to claim 1, wherein
- each module with rank i comprises a first connection port and a second connection port configured to be connected externally to a first communication link and a second communication link using a same interface, and internally to the various local units, and
- each module with rank i comprises a disconnection/connection unit for the connection ports of/to the local units and in parallel for connection/disconnection of the ports relative to each other, the switching between a first state in which the ports are connected to the local units and the ports are disconnected, and a second state in which the ports are disconnected from the local units and the ports are connected, being implemented by a control signal outside the module or an internal signal developed within the module.

10. A static converter with series architecture and decentralized control, designed to be powered by a voltage supply generator Vin and a current Iin and to provide an output voltage Vout and an output current Iout, comprising
- a first power supply input terminal, a second power supply input terminal, an output terminal, a total number q of electronic switching cells arranged in series, a same total number q of control modules, a chain of q communication links connecting the control modules of a closed loop,
- each electronic switching cell being associated with a single and different control module, the electronic switching cell and the associated control module being identified by a same single and different integer positioning rank i, comprised between 1 and q and larger when the switching cell is connected as close as possible to the power supply input terminals
- any two control modules, adjacent within the communication chain and with rank i, i+1, being connected by a single and different communication link $L_{i,i+1}$,
- the switching cells each comprising a single and different pair of electronic switches connected in parallel through a single and different floating capacitance positioned at the input of the switching cell toward the power supply input terminals when the positioning rank i is different from q, a first input pair of input terminals connected to the input of the two switches and to the floating capacitance, a second pair of output terminals connected to the output of the two switches,
- each control module respectively comprising a single and different local unit for generating a unique triangular voltage carrier,
- the local unit for generating the triangular carrier of any control module with rank i being configured to control the positioning of its interleaving phase within all of the interleaved triangular carriers based solely on the signals of the triangular carriers of the two modules with respective rank i−1, i+1 adjacent to the any module with rank i, provided by the two modules adjacent to the any module with rank i through two corresponding communication links, i being comprised between 1 and q, with i−1 equal to q when i is equal to 1, and i+1 equal to 1 when i is equal to q,
wherein
- each control module respectively comprises a single and different local unit for balancing voltages, and/or a single and different unit for internal regulation of the input current of the ACP type,
- the local unit for balancing the cell voltages of any module with rank i being configured to determine a cyclic ratio correction di based solely on the difference between the mean of the values of the two cell voltages $V_{i-1}$, $V_{i+1}$ of the switching cells whose modules with respective rank i−1, i+1 are adjacent to the any module with rank i and the value of the cell voltage Vi of the switching cell, the cell voltage Vi of any switching cell with rank i being equal to the difference between the differential input voltage Vai and the differential output voltage Vbi of the switching cell with rank i, and
- the internal unit regulating the input or output current of the ACP type of any module with rank i being configured by implementing a unique internal voltage and/or current loop to determine a unique cyclic ratio Di, the determination of Di depending on a product of the value of the voltage Vi passing through the branch connected to the switching cell associated with the any module with rank i and a slope factor αi depending on the rank i of the module.

11. The static converter with series architecture according to claim 10, wherein each control module comprises a local unit for balancing the cell voltages and an internal unit for regulating the input or output current of the ACP type, or comprises a local unit for balancing the cell voltages while having no internal unit for regulating the input or output current of the ACP type, and
- for each any module i, a measurement of the voltage Vi of the corresponding switching cell is provided through a first differential measurement of the input voltage Vai and a second differential measurement of the output voltage Vbi.

12. The static converter with series architecture according to claim 11, wherein each control module comprises a local unit for balancing the cell voltages while having no internal unit for regulating the input or output current of the ACP type, and
- wherein a main voltage and/or current regulating loop, outside the modules, is configured by an outside regulating unit to determine a common mode cyclic ratio D from a measurement of the output voltage Vout and/or a measurement of the input current Iin or output current Iout, and from a reference voltage Vref and/or a reference current Iref, and
- each module with rank i comprises a receiving terminal connected to the external regulating unit to receive the common mode cyclic ratio D, and a single and different adder to calculate a corrected cyclic ratio D'i as the sum of the cyclic ratio D of the common mode and the cyclic ratio correction di determined by the local unit for balancing the cell voltages of the module i.

13. The static converter with series architecture according to claim 12, wherein a main voltage and current regulating loop, outside the modules and of the ACP type, is configured by an external regulating module to determine a common mode cyclic ratio D with switching cells from the measurement of the output voltage Vout, the measurement of the input current Iin or the output current Iout, the reference current Iref and a main slope factor $\alpha$ for dummy current source, and each module with rank i comprises a receiving terminal connected to the external regulating unit to receive the ACP common mode cyclic ratio D, and a single and different adder to calculate a corrected cyclic ratio D'i as the sum of the cyclic ratio D of the ACP common mode and the cyclic ratio correction di determined by the local unit for balancing the cell voltages of the module i.

14. The static converter with series architecture according to claim 11, wherein each control module comprises a local unit for balancing the cell voltages and an internal unit for regulating the input current of the ACP type, and each internal unit for regulating the input current of the ACP type comprises an internal loop for regulating the input current of the ACP type, configured to determine a unique cyclic ratio Di from a measurement of the input current Iin, a measurement of the cell voltage Vi of the cell with rank i, a reference current Iref, and a corrected inverse slope factor $\alpha i$, the corrected inverse slope factor $\alpha i$ is proportional to the product of a mean main inverse slope factor $\alpha$ of the voltage source shared by all of the modules and the corrective factor $V_{ctrl}(i)$ determined by the local unit for balancing the cell voltages of the module i according to a proportionality ratio independent of the rank i of the module, the cyclic ratio Di unique to the cell with rank i depends on the difference between a reference voltage Vref and the product of the inverse of the inverse slope factor $\alpha i$ and the value of the measured cell voltage Vi for the cell with rank i, the reference voltage Vref being proportional to the difference between the reference current Iref and the value of the input current Iin measured according to a constant Z/R that is substantially identical over all of the control modules.

15. The static converter with series architecture according to claim 11, wherein each control module comprises a local unit for balancing the cell voltages and an internal unit for regulating the output current of the ACP type and each internal unit for regulating the output current of the ACP type comprises an internal loop for regulating the current of the ACP type, configured to determine a unique cyclic ratio Di from a measurement of the output current Iout, a measurement of the cell voltage Vi of the cell with rank i, a reference current Iref, and a corrected inverse slope factor $\alpha i$, the corrected inverse slope factor $\alpha i$ is proportional to the product of a mean main inverse slope factor $\alpha$ of the voltage source shared by all of the modules and the correction factor $V_{ctrl}(i)$ determined by the local unit for balancing the cell voltages of the module i according to a proportionality ratio independent of the rank i of the module, the cyclic ratio Di unique to the cell with rank i depends on the difference between a reference voltage Vref and the product of the inverse of the corrected inverse slope factor $\alpha i$ and the value of the measured cell voltage Vi for the cell with rank i, the reference voltage Vref being proportional to the difference between the reference current Iref and the value of the output current Iout measured according to a constant Z/R that is substantially identical over all of the control modules.

16. The static converter with series architecture according to claim 10, wherein each control module comprises a local unit for internal regulation of the input current of the ACP type while not having a local unit for balancing the cell voltages, and each local unit for regulating the input current of the ACP type comprises an internal loop for regulating the current of the ACP type, configured to determine a unique cyclic ratio Di from a measurement of the input current Iin, a measurement of the cell voltage Vi of the cell with rank i, a reference current Iref, and a corrected voltage source inverse slope factor $\alpha i$, the corrected inverse slope factor $\alpha i$ is adjusted to be substantially equal to a main inverse slope factor value $\alpha$ shared by all of the modules, the unique cyclic ratio Di depends on the difference between a reference voltage Vref and the product of the inverse of the unique inverse slope factor $\alpha i$ and the value of the measured cell voltage Vi for the cell with rank i, the voltage Vref being proportional to the difference between the reference current iref and the value of the input current Iin measured according to a constant Z/R that is substantially identical over all of the control modules.

17. The static converter with series architecture according to claim 10, wherein each control module comprises a local unit for internal regulation of the output current of the ACP type while not having a local unit for balancing the cell voltages, and each local unit for internal regulation of the output current of the ACP type comprises an internal loop for regulating the current of the ACP type, configured to determine a unique cyclic ratio Di from a measurement of the output current Iout, a measurement of the cell voltage Vi of the cell with rank i, a reference current Iref, and a corrected voltage source inverse slope factor $\alpha i$, the corrected inverse slope factor $\alpha i$ is adjusted to be substantially equal to a main inverse slope factor value $\alpha$ shared by all of the modules, the unique cyclic ratio Di depends on the difference between a reference voltage Vref and the product of the inverse of the unique inverse slope factor $\alpha i$ and the value of the measured cell voltage Vi for the cell with rank i, the voltage Vref being proportional to the difference between the reference current iref and the value of the output current Iout measured according to a constant Z/R that is substantially identical over all of the control modules.

18. The static converter with series architecture according to claim 10, wherein each module with any rank i, the modules adjacent to that module with rank i−1, i+1, and the corresponding communication links $L_{i-1,i}$, $L_{i,i+1}$ are configured to exchange relevant information related to the module of any rank i taken from among the cell voltage $V_i$ of the cell with rank i, the cell voltages $V_{i+1}$, $V_{i-1}$ of the adjacent cells with rank i−1, i+1, the triangular carrier signals of the module of any rank i and the modules adjacent to that module with rank i−1, i+1.

19. The static converter with parallel architecture according to claim 10, wherein each module with rank i comprises a first connection port and a second connection port configured to be connected externally to a first communication link and a second communication link using a same interface, and internally to the various local units, and each module with rank i comprises a disconnection/connection unit for the connection ports of/to the local units and in parallel for connection/disconnection of the ports relative to each other, the switching between a first state in which the ports are connected to the local units and the ports are disconnected, and a second state in which the ports are disconnected from the local units and the ports are connected, being implemented by a control signal outside the module or an internal signal developed within the module.

* * * * *